(12) United States Patent
Russell et al.

(10) Patent No.: US 10,256,741 B2
(45) Date of Patent: Apr. 9, 2019

(54) ADAPTIVE SYNCHRONOUS SWITCHING IN A RESONANT CONVERTER

(71) Applicant: Nexgen Power Systems, Inc., Santa Clara, CA (US)

(72) Inventors: Antoin Russell, Berkeley, CA (US); Alberto Doronzo, San Jose, CA (US)

(73) Assignee: NEXGEN POWER SYSTEMS, INC., Santa Clara, CA (US)

( * ) Notice: Subject to any disclaimer, the term of this patent is extended or adjusted under 35 U.S.C. 154(b) by 0 days.

(21) Appl. No.: 15/697,170

(22) Filed: Sep. 6, 2017

(65) Prior Publication Data
US 2018/0166997 A1 Jun. 14, 2018

Related U.S. Application Data

(63) Continuation of application No. 14/574,176, filed on Dec. 17, 2014, now abandoned, which is a
(Continued)

(51) Int. Cl.
*H02M 7/06* (2006.01)
*H02M 7/217* (2006.01)
(Continued)

(52) U.S. Cl.
CPC .............. *H02M 7/06* (2013.01); *H02M 1/32* (2013.01); *H02M 3/1588* (2013.01);
(Continued)

(58) Field of Classification Search
CPC ......... H02M 3/33507; H02M 3/33569; H02M 3/3385; H02M 3/335; H02M 3/33538;
(Continued)

(56) References Cited

U.S. PATENT DOCUMENTS 4,788,634 A 11/1988 Schlecht et al.
5,532,919 A 7/1996 Gegner
(Continued)

FOREIGN PATENT DOCUMENTS

CN 1324141 A 11/2001
CN 103280995 A 9/2013
(Continued)

OTHER PUBLICATIONS

U.S. Appl. No. 14/213,195, "Final Office Action", dated Jun. 23, 2016, 16 pages.
(Continued)

*Primary Examiner* — Jue Zhang
*Assistant Examiner* — Kevin H Sprenger
(74) *Attorney, Agent, or Firm* — Kilpatrick Townsend & Stockton LLP

(57) ABSTRACT

An embodiment of a resonant converter includes having resonant circuitry having inductive and capacitive elements configured to create electrical resonance when an input voltage is applied and a synchronous rectifier coupled between at least a portion of the resonant circuitry and an output of the resonant converter. The synchronous rectifier includes a diode, and an electrical switch. Control circuitry is configured to operate the electrical switch such that the electrical switch is turned on when there is substantially no voltage across the diode and current flow in the diode is positive in a direction from anode to cathode.

17 Claims, 20 Drawing Sheets

Related U.S. Application Data continuation of application No. 14/213,361, filed on Mar. 14, 2014, now abandoned.

(51) Int. Cl.
  *H02M 1/32* (2007.01)
  *H02M 3/158* (2006.01)
  *H02M 3/335* (2006.01)
  *H02M 1/00* (2006.01)

(52) U.S. Cl.
  CPC ....... *H02M 3/33592* (2013.01); *H02M 7/217* (2013.01); *H02M 2001/0035* (2013.01); *H02M 2001/0058* (2013.01); *H02M 2001/0064* (2013.01); *Y02B 70/1425* (2013.01); *Y02B 70/1433* (2013.01); *Y02B 70/1466* (2013.01); *Y02B 70/1475* (2013.01); *Y02B 70/1491* (2013.01); *Y02B 70/16* (2013.01)

(58) Field of Classification Search
  CPC ......... H02M 3/33523; H02M 3/33515; H02M 3/33592; H02M 3/33576; H02M 3/33561; H02M 3/33546; H02M 3/156; H02M 3/1563; H02M 3/135; H02M 3/137; H02M 3/10; H02M 3/157; H02M 3/1584; H02M 2007/4815; H02M 2001/0032; H02M 1/06; H02M 1/4208; H02M 1/36; H02M 1/32; H02M 1/4258; H02M 7/7575; H02M 7/217; H02M 7/219; H02M 7/10; H02M 7/06; H02M 7/068; H02M 7/537; H02M 7/003; H02M 7/5387; H02M 7/538; H02M 7/53871
  USPC .... 363/21.02–21.18, 16, 123–127, 131–132; 323/222
  See application file for complete search history.

(56) References Cited

U.S. PATENT DOCUMENTS

| | | | |
|---|---|---|---|
| 6,631,082 B2 | 10/2003 | Birumachi et al. | |
| 8,472,219 B2 | 6/2013 | Srighakollapu et al. | |
| 8,767,418 B2 | 7/2014 | Jungreis et al. | |
| 9,787,200 B2 * | 10/2017 | Fu | H02M 3/33546 |
| 9,793,799 B1 * | 10/2017 | Babazadeh | H02M 1/08 |
| 2003/0048648 A1 | 3/2003 | Lin et al. | |
| 2003/0095421 A1 | 5/2003 | Kadatskyy et al. | |
| 2003/0227280 A1 | 12/2003 | Vinciarelli | |
| 2006/0214603 A1 | 9/2006 | Oh et al. | |
| 2007/0230228 A1 | 10/2007 | Mao | |
| 2009/0040792 A1 | 2/2009 | Yang et al. | |
| 2009/0102541 A1 | 4/2009 | Lopez et al. | |
| 2010/0026095 A1 | 2/2010 | Phadke et al. | |
| 2010/0026208 A1 | 2/2010 | Shteynberg et al. | |
| 2010/0118565 A1 | 5/2010 | Stuler | |
| 2010/0315839 A1 | 12/2010 | Yang et al. | |
| 2010/0328969 A1 | 12/2010 | Meyer et al. | |
| 2011/0096578 A1 | 4/2011 | Fang et al. | |
| 2012/0069606 A1 | 3/2012 | Sagneri et al. | |
| 2012/0206946 A1 | 8/2012 | Sagneri et al. | |
| 2013/0188397 A1 | 7/2013 | Wu et al. | |
| 2014/0036545 A1 | 2/2014 | Reddy et al. | |
| 2014/0225439 A1 | 8/2014 | Mao et al. | |
| 2014/0233275 A1 | 8/2014 | Yang et al. | |
| 2014/0254203 A1 | 9/2014 | Dai et al. | |
| 2015/0263628 A1 | 9/2015 | Russell et al. | |
| 2015/0263639 A1 | 9/2015 | Russell et al. | |
| 2015/0263640 A1 | 9/2015 | Russell et al. | |

FOREIGN PATENT DOCUMENTS

| | | |
|---|---|---|
| CN | 10623360 A | 12/2016 |
| JP | 10164837 A | 6/1998 |
| JP | 1155945 A | 2/1999 |
| JP | 2001197728 A | 7/2001 |
| JP | 2003033013 A | 1/2003 |
| JP | 2013031368 A | 2/2013 |
| KR | 1020100004620 A | 1/2010 |
| WO | 2015138880 | 9/2015 |

OTHER PUBLICATIONS

U.S. Appl. No. 14/213,195, "Non-Final Office Action", dated Oct. 23, 2015, 16 pages.
U.S. Appl. No. 14/213,361, "Final Office Action", dated Nov. 9, 2015, 20 pages.
U.S. Appl. No. 14/213,361, "Non-Final Office Action", dated Mar. 3, 2015, 18 pages.
U.S. Appl. No. 14/574,176, "Corrected Notice of Allowance", dated Nov. 2, 2015, 5 pages.
U.S. Appl. No. 14/574,176, "Non-Final Office Action", dated Mar. 3, 2015, 16 pages.
U.S. Appl. No. 14/574,176, "Non-Final Office Action", dated Mar. 7, 2017, 14 pages.
U.S. Appl. No. 14/574,176, "Non-Final Office Action", dated May 6, 2016, 7 pages.
U.S. Appl. No. 14/574,176, "Notice of Allowance", dated Sep. 2, 2015, 8 pages.
PCT/US2015/020421, "International Preliminary Report on Patentability", dated Sep. 22, 2016, 8 pages.
PCT/US2015/020421, "International Search Report and Written Opinion", dated May 29, 2015, 11 pages.
CN201580021971.7, "Office Action", dated Aug. 29, 2018, 11 pages.
JP2016-557231, "Office Action", dated Jan. 7, 2019, 21 pages.

* cited by examiner

ADAPTIVE SYNCHRONOUS SWITCHING IN A RESONANT CONVERTER

CROSS-REFERENCE TO RELATED APPLICATIONS

This application is a continuation of U.S. patent application Ser. No. 14/574,176, filed on Dec. 17, 2014; which is a continuation of U.S. patent application Ser. No. 14/213,361, filed on Mar. 14, 2014. The entire disclosures of the above application are hereby incorporated by reference, for all purposes, as if fully set forth herein.

BACKGROUND

Power electronics are widely used in a variety of applications. Power adapters having power electronic circuits are commonly used to convert the form of electrical energy, for example, from AC to DC, from one voltage level to another, or in some other way. Such devices can operate over a wide range of power levels, from milliwatts in mobile devices to hundreds of megawatts in a high voltage power transmission system. Despite the progress made in power electronics conversion systems, there is a need in the technology for advanced systems architecture and methods of operating the same to achieve high efficiencies and improve on size, weight, and complexity of the power electronic devices and its applications.

SUMMARY OF THE INVENTION

The present invention relates generally to power electronic converters. More specifically, the present invention relates to resonant converter and adaptive control circuitry. Embodiments may utilize techniques including (1) synchronous switching on resonant circuit primary switches, (2) synchronous switching on output synchronous rectifier drive circuits, (3) operating the resonant converter in "burst mode" to maintain zero-voltage switching under light to heavy load conditions, and/or (4) active voltage clamping to minimize unnecessary energy clamping that can lead to added component dissipation and reduced power converter efficiency.

An embodiment of a resonant converter, according to the disclosure, includes resonant circuitry having inductive and capacitive elements configured to create electrical resonance when an input voltage is applied a synchronous rectifier coupled between at least a portion of the resonant circuitry and an output of the resonant converter. The synchronous rectifier includes a diode and an electrical switch. Control circuitry is configured to operate the electrical switch such that the electrical switch is turned on when there is substantially no voltage across the diode and current flow in the diode is positive in a direction from anode to cathode.

An embodiment of a method of providing electrical power conversion, according to the disclosure, includes providing a resonant converter with resonant circuitry having inductive and capacitive elements to create electrical resonance when an input voltage is applied to the resonant circuitry. The method further includes rectifying an output voltage of the resonant converter using a synchronous rectifier coupled between at least a portion of the resonant circuitry and an output of the resonant converter. The synchronous rectifier includes a diode and an electrical switch. The method also includes operating the electrical switch such that the electrical switch is turned on when there is substantially no voltage across the diode and current flow in the diode is positive in a direction from anode to cathode.

Another embodiment of a resonant converter includes resonant circuitry having inductive and capacitive elements configured to create electrical resonance when an input voltage is applied, and a first synchronous rectifier and a second synchronous rectifier. Each of the first synchronous rectifier and the second synchronous rectifier includes a diode and an electrical switch in parallel with the diode. Control circuitry is configured to operate the first synchronous rectifier and the second synchronous rectifier such that, for each of the first synchronous rectifier and the second synchronous rectifier, the electrical switch is turned on when current flow in the diode is positive in a direction from anode to cathode.

Numerous benefits are achieved by way of the present invention over conventional techniques. Methods provided herein enable an AC-DC converter to operate efficiently while maintaining a desired output power level from light to heavy loads. By attaining high efficiency, power system thermal requirement is reduced and power density is significantly increased. Moreover, the disclosed techniques can assist in preserving the integrity of the switching elements when operating at high voltages and/or frequencies. Disclosed techniques can apply to both isolated and non-isolated resonant converters. These and other embodiments of the invention, along with many of its advantages and features, are described in more detail in conjunction with the text below and attached figures.

Figure 1:
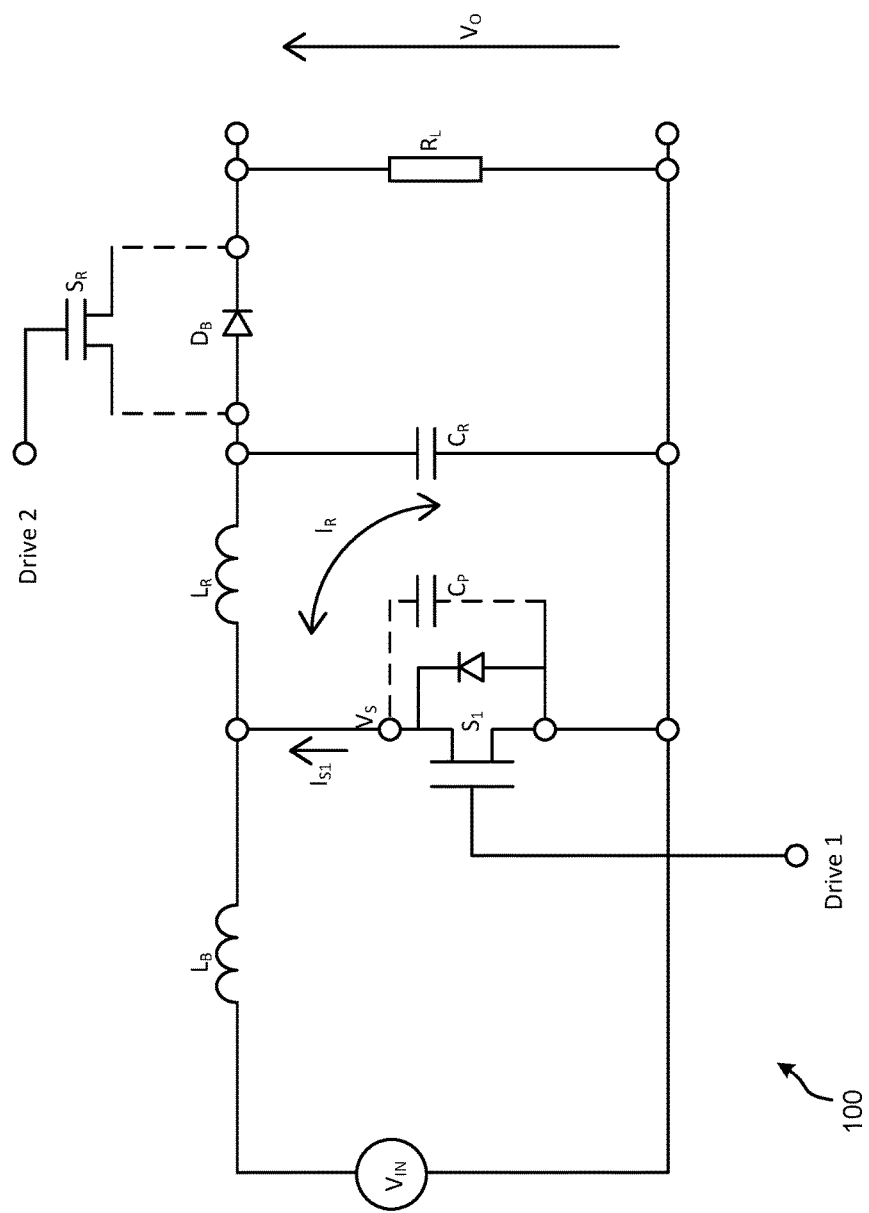
FIG. 1 is a schematic diagram illustrating a non-isolated resonant converter, according to one embodiment.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The present invention relates generally to power electronic converters. More specifically, the present invention relates to an adaptive resonant converter and associated control circuitry. The disclosed embodiments have the capability to adapt to internal and external changes and operate under varying line, load, environmental and component parameters and yet preserve very high efficiency ranging from no load to heavy loads. Such a power converter can be utilized, for example, in AC-DC power converter to power any of a variety of electronic devices such as laptop computers, USB-powered devices, and the like with very high power densities. Techniques detailed herein can apply to both isolated and non-isolated resonant converters.

Among other things, four methods and techniques are applied in the disclosed embodiments as follows. 1) A synchronous switching technique is used on resonant circuit primary switches. By utilizing zero-voltage switching, embodiments of the invention can provide for greatly-reduced switching losses. 2) A synchronous switching technique is also used on output synchronous rectifier drive circuits. Control circuitry may monitor voltage and/or current across certain switches in the primary and/or secondary circuits to enable such efficient switching. 3) Embodiments may include operating the resonant converter in a "burst mode" to maintain that zero-voltage switching under light to heavy load conditions. This function is automatically adjusted to compensate for variations in line and load, also environmental and/or component parameter changes. Further, the "burst mode" function can be user programmable in order to adapt to application and preserve the premium efficiencies. 4) An active voltage clamping circuit is used to minimize unnecessary energy clamping that leads to added component dissipation and results in reduced power converter efficiency. This is especially the case when isolation transformer in resonant converters is purposely designed with high leakage inductance for integration and reduced component counts. The relationship between primary resonant inductance (Lp) and transformer leakage inductance (Llk) is:

$$Lp = (Llk \cdot Np^2)/Ns^2 \quad (1)$$

for a 1:1 transformer ratio Lp=Llk. Leakage inductance is selected for maximum power transfer from primary to secondary circuits.

Advanced high density power electronic packaging can be applied to reduce significantly loop inductance of power stages and switching losses especially in high frequency resonant converters. Power switching interconnections techniques can have benefits in sensing, thermal management, and EMI containment. A fabricated integrated structure by means of integrated process flow can be replaced by an assembled one.

Further, part or all techniques disclosed can be applied to a Power Factor Correction (PFC) or active rectifier circuit feeding a resonant converter.

Below is description of the above-referenced circuits and techniques.

Synchronous Switching

Control circuitry may monitor voltage and/or current across-circuit switches to enable synchronous zero-voltage switching. There are many different ways to sense voltage or current. Embodiments are not particular to a specific method in which voltage or current sensing is accomplished. For example, current can be measured by hall-effect sensors, precision resistors with or without active circuits for isolation, or current transformers. Sensing primary current alone may not be a good representative of output resonant current for switching purposes. There is a significant phase shift between the primary current and secondary current that can vary with load, temperature and component parameter changes.

In some cases one current sensor can be utilized to monitor resonant current and predict current through two or more switches in isolated and non-isolated resonant circuits. Control may use the desired voltage and current feedbacks to determine best turn-on time of a particular switch.

FIG. 1 is a schematic diagram illustrating a non-isolated resonant converter 100, according to one embodiment. The embodiment shown in FIG. 1 and elsewhere herein are provided as non-limiting examples. One of ordinary skill in the art would recognize many variations, modifications, and alternatives to the components provided herein.

In FIG. 1, the non-isolated resonant converter 100 is configured to take an input voltage $V_{IN}$, which may be an AC, DC, or Rectified AC voltage source, and provide an output voltage $V_O$, which can be greater than the input voltage $V_{IN}$. Operation of the non-isolated resonant converter 100 is determined, in part, by the operation of Drive 1, which drives electronic switch $S_1$, modulating the switch $S_1$ to meet power requirements, thereby making the non-isolated resonant converter 100 self-adapting. Inductive elements $L_B$ and $L_R$ and capacitive elements $C_P$ and $C_R$ enable electrical resonance in the non-isolated resonant converter 100. $C_P$ is the lumped circuit capacitance at the node V, which may include the parasitic capacitance of the semiconductor switch $S_1$ and any other electrically connected stray capacitances at that node such as the $L_B$, $L_R$ associated capacitances, and the circuit loading of the $L_R$, $C_R$ network. Synchronous rectification at the output is provided by switch $S_R$ and diode $D_B$, and output power is provided across a load resistance $R_L$. Additional detail regarding synchronous rectification and Drive 2 are provided herein below.

To enable the non-isolated resonant converter 100 to operate in high-power applications at a high switching frequency, specialized components can be utilized. For example, in some embodiments, the transistors and diodes utilized in the switches can be devices based on a wide bandgap material, such as GaN or silicon carbide (SiC). This can enable the non-isolated resonant converter 100 to operate at higher voltages, higher temperatures, and higher frequencies than solutions using traditional silicon-based devices. However, any semiconductor device can be used.

Specialty magnet materials and geometry may be used to advance the high frequency operation of the resonant circuits when isolation transformers are used. Advanced material may also be used for other magnetic components when non-isolated and isolated topologies are utilized.

The values of the various components utilized in the non-isolated resonant converter 100 can vary, depending on desired functionality, manufacturing concerns, and/or other factors.

Figure 2:
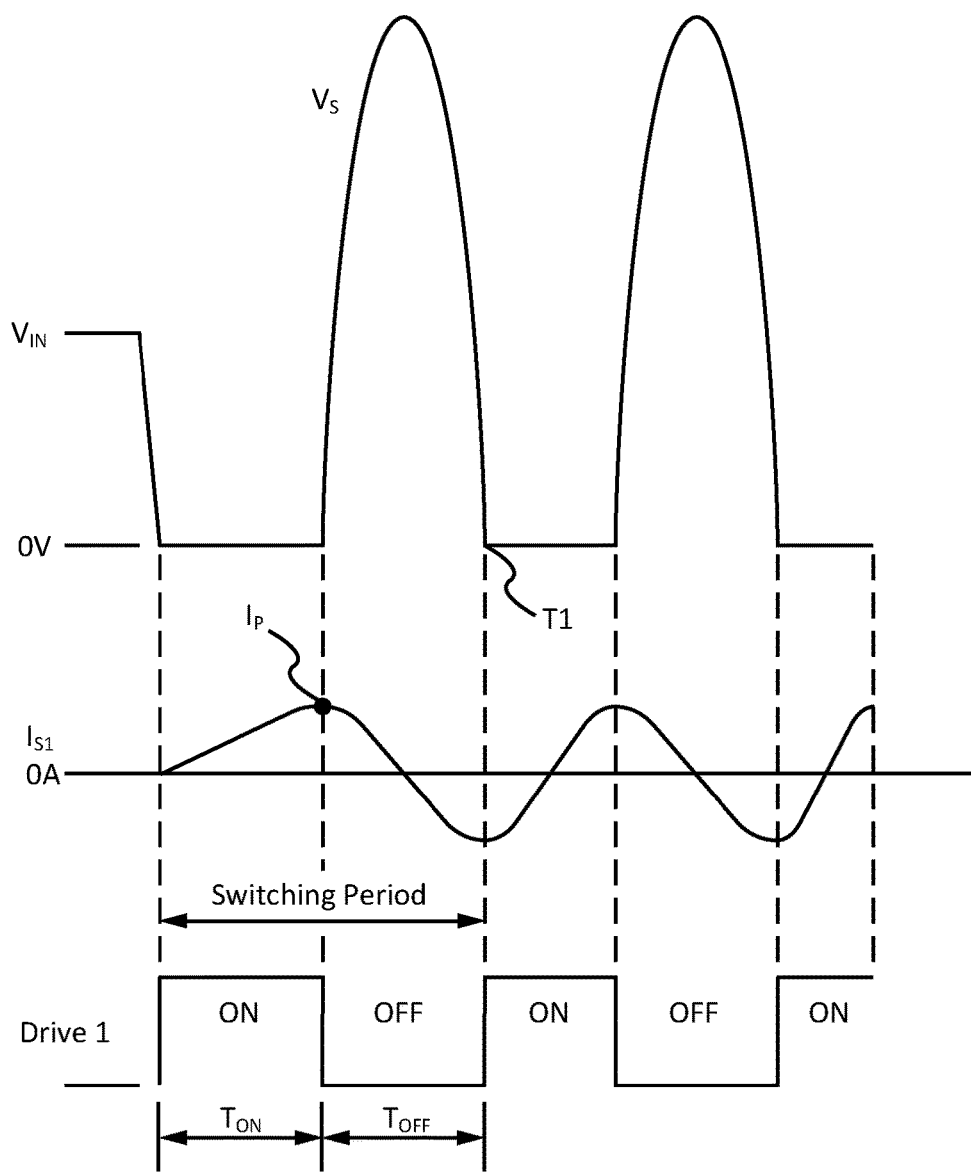
FIG. 2 is a drawing of waveforms for $V_S$, $I_{S1}$, and Drive 1 of the non-isolated resonant converter of FIG. 1.

FIG. 2 is a drawing of waveforms for $V_S$, $I_{S1}$, and Drive 1 of the non-isolated resonant converter 100 of FIG. 1, provided to help illustrate the operation of the non-isolated resonant converter 100. The waveform of Drive 1 shows how Drive 1 can operate switch $S_1$ to undergo several on/off cycles having switching periods including a time the switch is turned on, $T_{ON}$, and a time the switch is turned off, $T_{OFF}$.

As shown, when switch $S_1$ is on, the voltage at the node $V_S$ reduces and the current $I_{S1}$ begins to ramp up, reaching a peak current $I_P$ when Drive 1 turns the switch $S_1$ off. When switch $S_1$ is off, resonance between $L_B$, $C_P$, and equivalent impedance of $L_R$ and $C_R$ impedance occurs. Current flows into $C_R$ where, in some embodiments, a voltage of up to three times the input voltage $V_{IN}$ can be achieved. However, $V_S$ then reduces to a lower voltage than $V_{IN}$ due to the reversal of the current $I_{S1}$. The frequency of the resonance will be according to the equation:

$$Fr := \frac{1}{2 \cdot \pi \cdot \sqrt{L \cdot C}} \qquad (2)$$

Where L and C are the Thevenin equivalent inductance and capacitance at node $V_S$.

One beneficial feature of the non-isolated resonant converter 100 is that the voltage waveform created by the switching of $S_1$ and the resonance created between $L_B$, $L_R$, and $C_P$ allows for zero-voltage switching of $S_1$. That is, $S_1$ is switched when the voltage across $S_1$ is at or near zero volts, which greatly reduces the switching loss in the capacitance $C_P$. The voltage across $S_1$ returns to zero volts when the magnitude of the $I_{S1}$ is great enough, and the voltage is held at zero volts through the action of the parasitic or intentionally included parallel diode connected in parallel to $S_1$ or the subsequent turn on of $S_1$ at an optimal time T1.

For an optimal turn on of $S_1$ at T1, the voltage $V_S$ can be monitored either directly or via a similar representative voltage waveform (e.g., transformer winding). For example, a zero-voltage-detection circuit can be utilized such that when $V_S$ is approaching or at zero volts, the next $T_{ON}$ transition for $S_1$ is started.

The increased efficiency from zero-voltage switching of $S_1$ node comes from the minimization of the energy in capacitance $C_P$ which would otherwise be dissipated in $S_1$ according to the formula:

$$EnergyCp := \tfrac{1}{2} \cdot Cp \cdot Vs^2 \qquad (3)$$

for each switching period.

By quickly turning on $S_1$ as when the voltage is at or near zero volts also reduces and/or eliminates the conduction in the parallel diode (parasitic on intentional) to $S_1$.

The zero-voltage-detection circuit and optimal turn-on of $S_1$ at T1 is also beneficial in that variations in the dynamic or initial values of the resonant network (inductance, capacitance or resistance) will change the shape of the resonant waveform and also change the optimal turn-on start time T1. However, the zero-voltage-detection circuit can adapt the switching waveform every switching cycle to help ensure T1 is optimal, largely independent of other circuit variations.

Figure 3A:
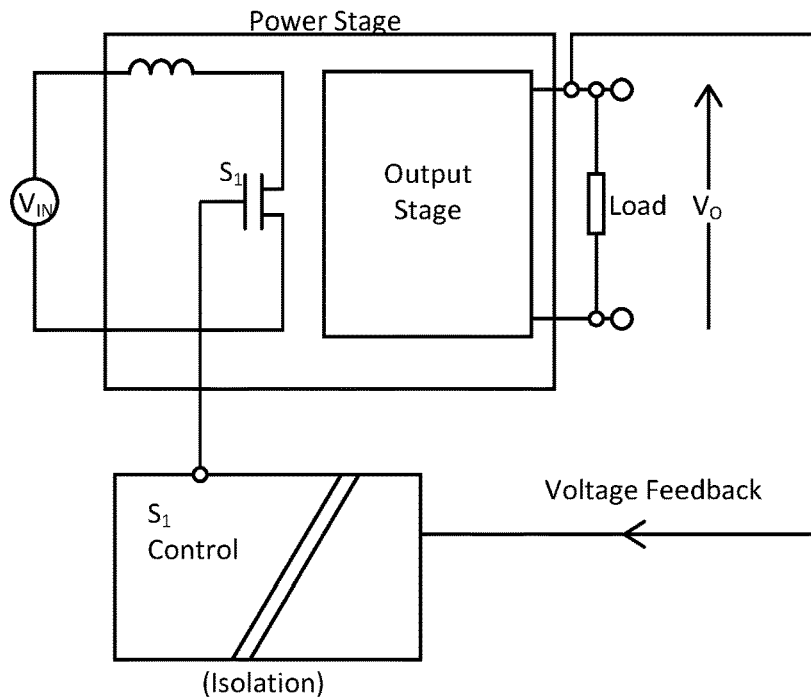
FIGS. 3A and 3B are schematic diagrams illustrating types of feedback that can be used to inform the control circuitry.
Figure 3B:
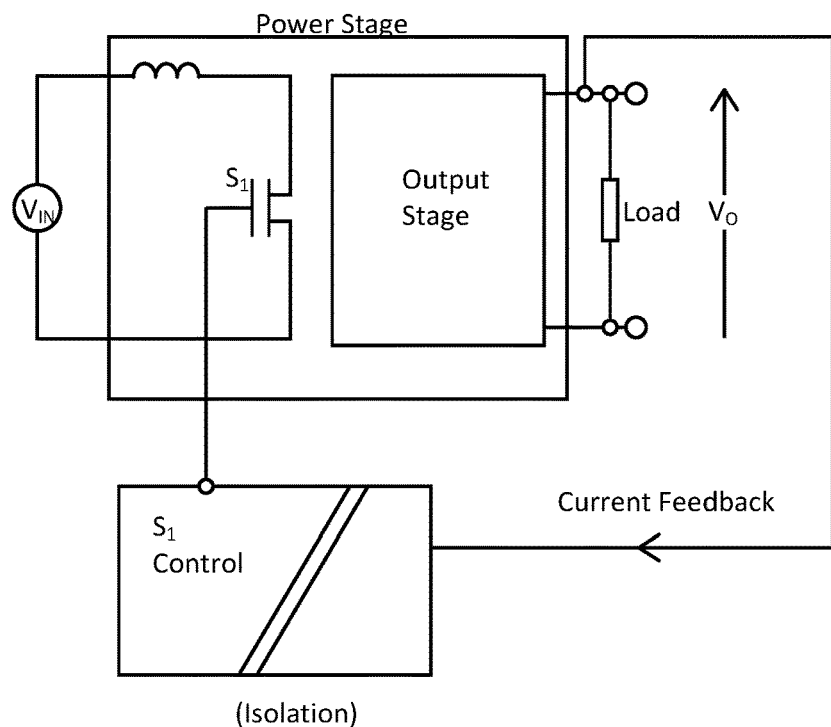

The efficient power transfer from the input to the output ($V_{IN}$ to $V_O$) of a non-isolated resonant converter 100, and similar resonant converters, is therefore primarily governed by the controlling of $S_1$ on and off times while maintaining the resonant operation to obtain zero-voltage switching. FIGS. 3A and 3B are simplified illustrations schematics of how feedback can be used in the control circuit driving $S_1$, in various embodiments of a resonant converter.

FIG. 3A illustrates providing feedback in the system around the power stage with voltage feedback. FIG. 3B, on the other hand, illustrates providing feedback in the system around the power stage with current feedback. It can be noted, however, that other configurations may utilize a combination of both. For example, embodiments may utilize power feedback (where $P_O = V_O * I_O$), in order to control the energy that is delivered to the output. As illustrated, the feedback signal in some embodiments may be galvanically isolated (input to output) in an isolated version of the controller scheme, with a signal isolation circuit (such as an opto-coupler or signal transformer).

Embodiments may potentially utilize a variety of different methods for modulating $S_1$ to achieve output regulation while maintaining zero-voltage switching. Three such methods include frequency modulation, on-time ($T_{ON}$) modulation, and pulse density modulation or "burst mode." This art includes a controlled burst mode to maintain zero-voltage switching under varying internal and external conditions. Details of this feature are described below.

Synchronous Switching Output Stages

Synchronous switching may also be utilized on output stage of a resonant power converter to further reduce losses and increase efficiency. Synchronous rectification can provide benefits to topologies such as flyback. Example benefits include: 1) Magnetizing current can be negative, hence discontinuous conduction mode is avoided and the output voltage is regulated even under no load conditions; 2) zero-voltage switching can be achieved; and 3) conduction losses of the rectifier are significantly reduced specially at low voltage levels.

Below are examples with isolated and non-isolated configurations.

Figure 7:
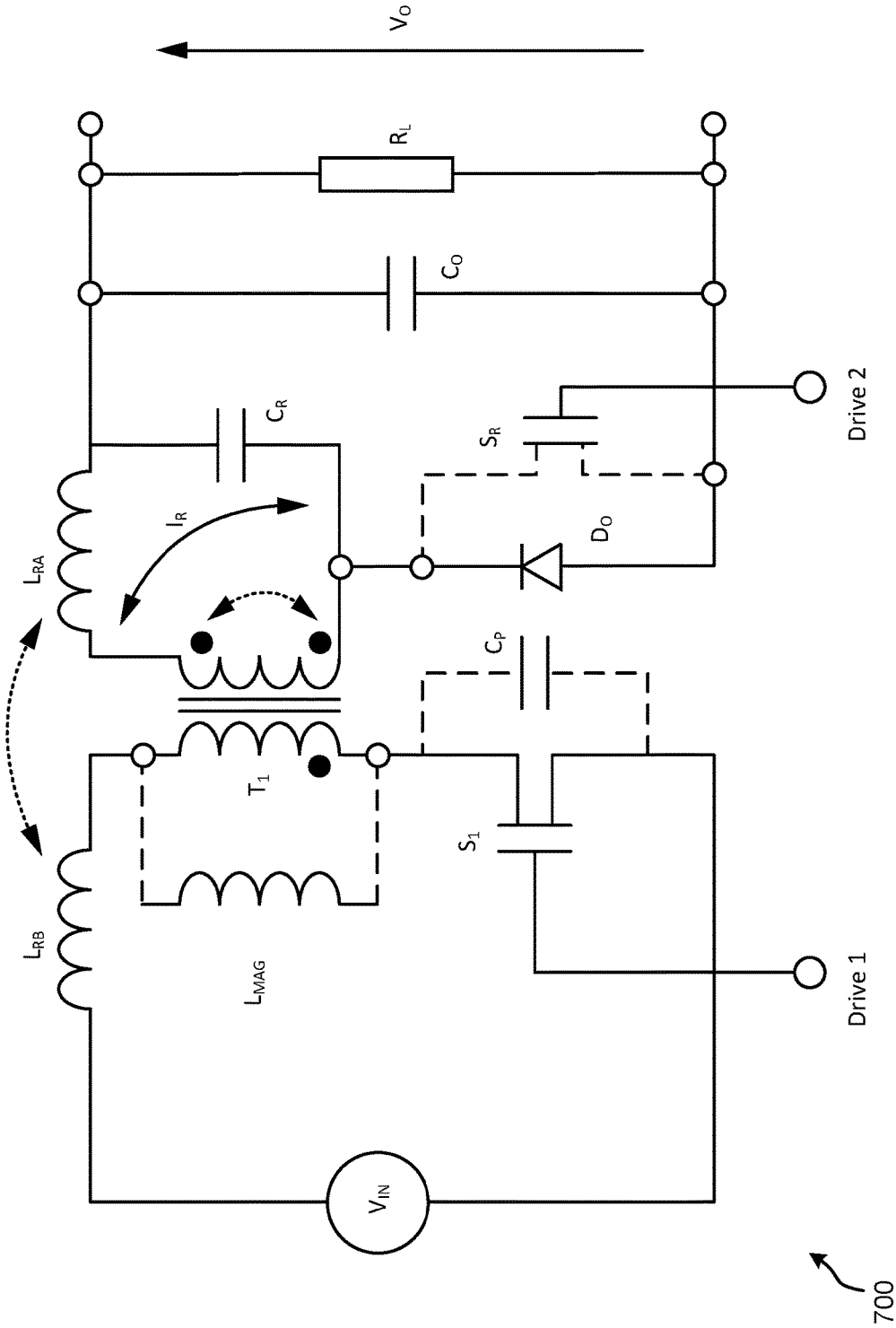
FIG. 7 is a schematic diagram illustrating an isolated resonant converter, according to one embodiment.

As illustrated in FIG. 1, the non-isolated resonant converter 100 is a simple embodiment of a converter in which isolation is not provided. As illustrated in FIG. 7 and subsequent figures, however, many variations on the simple design of FIG. 1 can be made, including using circuitry that provides isolation.

FIG. 7 is a schematic diagram illustrating an isolated resonant converter 700, according to one embodiment. In this embodiment, a transformer $T_1$ provides isolation, and may additionally provide voltage change as well, depending on desired functionality. Double-ended arrows with dotted lines indicate alternative configurations. Thus, the secondary winding of the transformer $T_1$ may be coupled either way, depending, for example, on the desired phase in which the isolated resonant converter 700 is to be operated, as described in more detail below. In some embodiments, the $L_B$ inductor of FIG. 1 can be complemented and/or entirely replaced by the transformer $T_1$ magnetizing inductance $L_{MAG}$. Additionally, as indicated, the resonant inductor $L_R$ can be placed either on the input side ($L_{RB}$) or the output side ($L_{RA}$). Alternatively, some embodiments may include both.

The values of the inductive elements can vary, depending on the input and/or output specifications of the converter. If, for example, the output voltage is much lower than the input voltage, the value of the resonant inductance can be reduced by the square of the transformer turns ratio to achieve a much lower value of inductance $L_{RA}$ in comparison to $L_{RB}$. This can facilitate, for example, the use of a much lower loss air-core inductor instead of one with a magnetic core in position $L_{RB}$, which would introduce more loss in the inductance.

Inductance on either or both of the input side ($L_{RB}$) or the output side ($L_{RA}$) can also be included in the circuit by the addition of leakage inductance between the primary and secondary winding. Leakage inductance increases through increasing the physical separation between primary and secondary windings.

Figure 8:
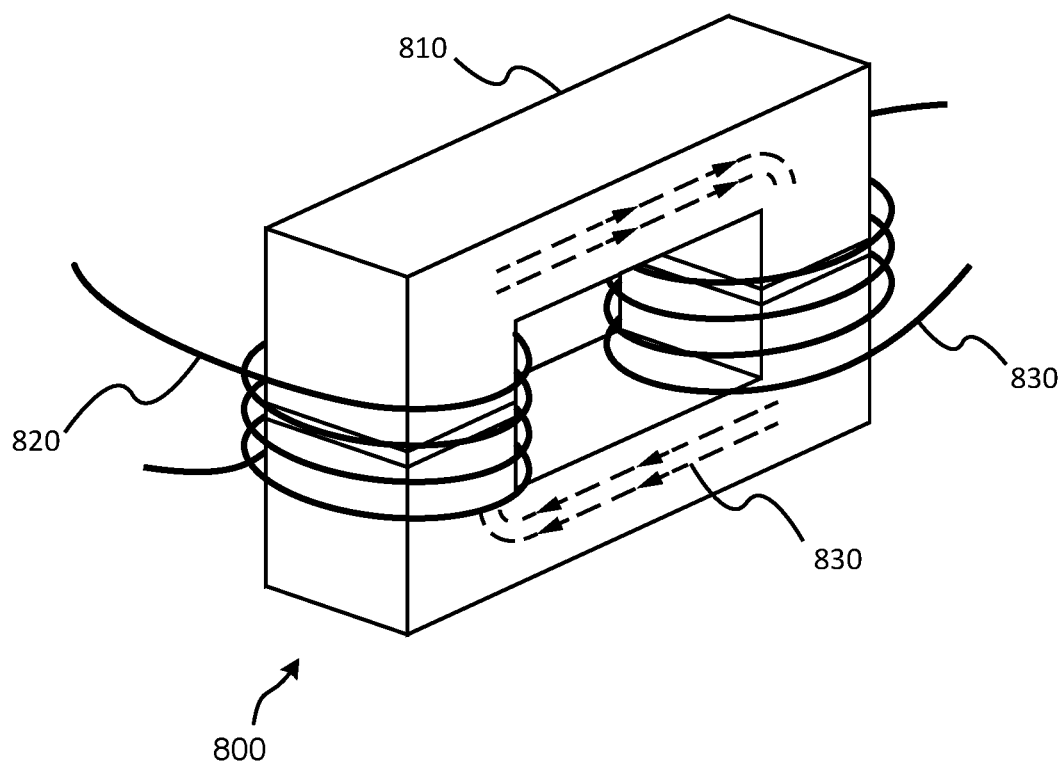
FIG. 8 is a simplified illustration of a transformer that can provide leakage inductance, according to one embodiment.

FIG. 8 is a simplified illustration of a transformer 800 that can provide such leakage inductance, according to one embodiment. According to this embodiment, instead of winding primary and secondary windings on the same core leg (e.g., on top of each other) they can be wound side-by-side or on separate legs to each other, to deliberately introduce a desired amount of leakage inductance. Here, a magnetic core 810 is wound with a primary winding 820 on one side, and a secondary winding 830 on the other side, the magnetic core 810 conducting the magnetic flux 840 between the windings.

This method, when applied to the topology of FIG. 8 (as well as other embodiments providing isolation), can have at least two significant benefits. First, the components $L_{RA}$ and/or $L_{RB}$ can be eliminated as physical components. And second, galvanic isolation can be much more easily achieved between primary winding 820 and secondary winding 830. This is the case where the windings are wire-wound or embedded in a multilayer printed circuit board. Further, because the windings are not stacked on each top of other, the number of winding layers is reduced by half. This can greatly reduce the cost of a multi-layer printed circuit board (PCB), in embodiments in which PCB is used for constructing windings. In embodiments not using PCB, manufacturing costs can still be reduced because windings are relatively easy to wind and the transformer requires no insulation tape.

In further reference to the isolated resonant converter 700 of FIG. 7, the polarity of the secondary winding 830 of the transistor 800 may be in either direction, which can determine the phase of $S_1$ on which the power transfer happens through $L_R$ ($L_{RA}$ and/or $L_{RB}$) and $C_R$.

Specialty magnet materials and geometry may be used to advance the high frequency operation of the isolated resonant circuits. Advanced material may also be used for other magnetic components in circuit.

In the isolated resonant converter 700 of FIG. 7, the output diode $D_O$ can be moved to a zero voltage reference (i.e., output GND) instead of the output positive voltage rail. This means that it can be much easier to include a semiconductor switch rectifier in addition to or in replacement of a diode rectifier $D_O$ because the reference for the drive signal Drive 2 can be zero volts.

Figure 9:
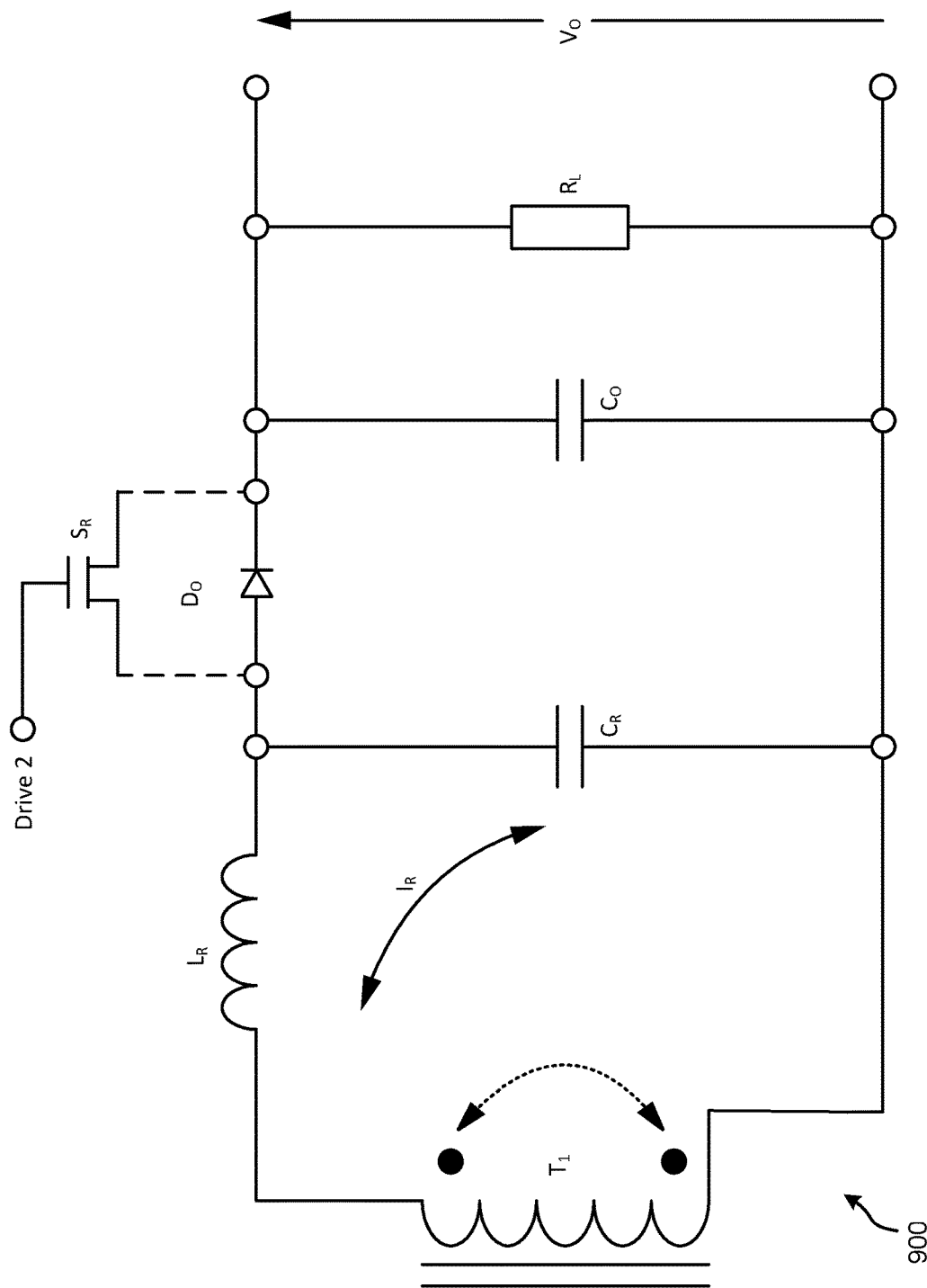
FIGS. 9-12 are schematic diagrams illustrating various embodiments of an output stage of an isolated resonant converter.

FIG. 9 illustrates an embodiment of an output stage 900 of an isolated resonant converter. This output stage can, for example, be a variation on the output stage of the isolated resonant converter 700 of FIG. 7. Here, as in FIG. 7, the secondary winding of transformer $T_1$ may be coupled in either orientation, depending on desired functionality. In this output stage 900, $D_O$ is located in the high side (positive voltage rail) in a configuration similar to the non-isolated resonant converter. As indicated previously, this configuration is possible, but it can be more difficult to provide a drive waveform for a semiconductor switch.

Semiconductor switches instead of or in parallel with diode positions (as shown), known as synchronous rectifiers can reduce the conduction losses of the switch. Such synchronous rectifiers can be included in many applications where lower resistance is desired. Additional detail regarding Drive 2 is provided herein below.

Note that the position of the capacitor $C_R$ in FIGS. 7 and 9 can additionally or alternatively be across the diode $D_O$ position. Because $C_R$ is typically much smaller than the output capacitance, $C_R$ therefore forms an electrically equivalent circuit when in series with the much larger output capacitance. The resonant circuit discussed in previous embodiments therefore also includes the parasitic capacitance of the diode $D_O$.

Figure 10:
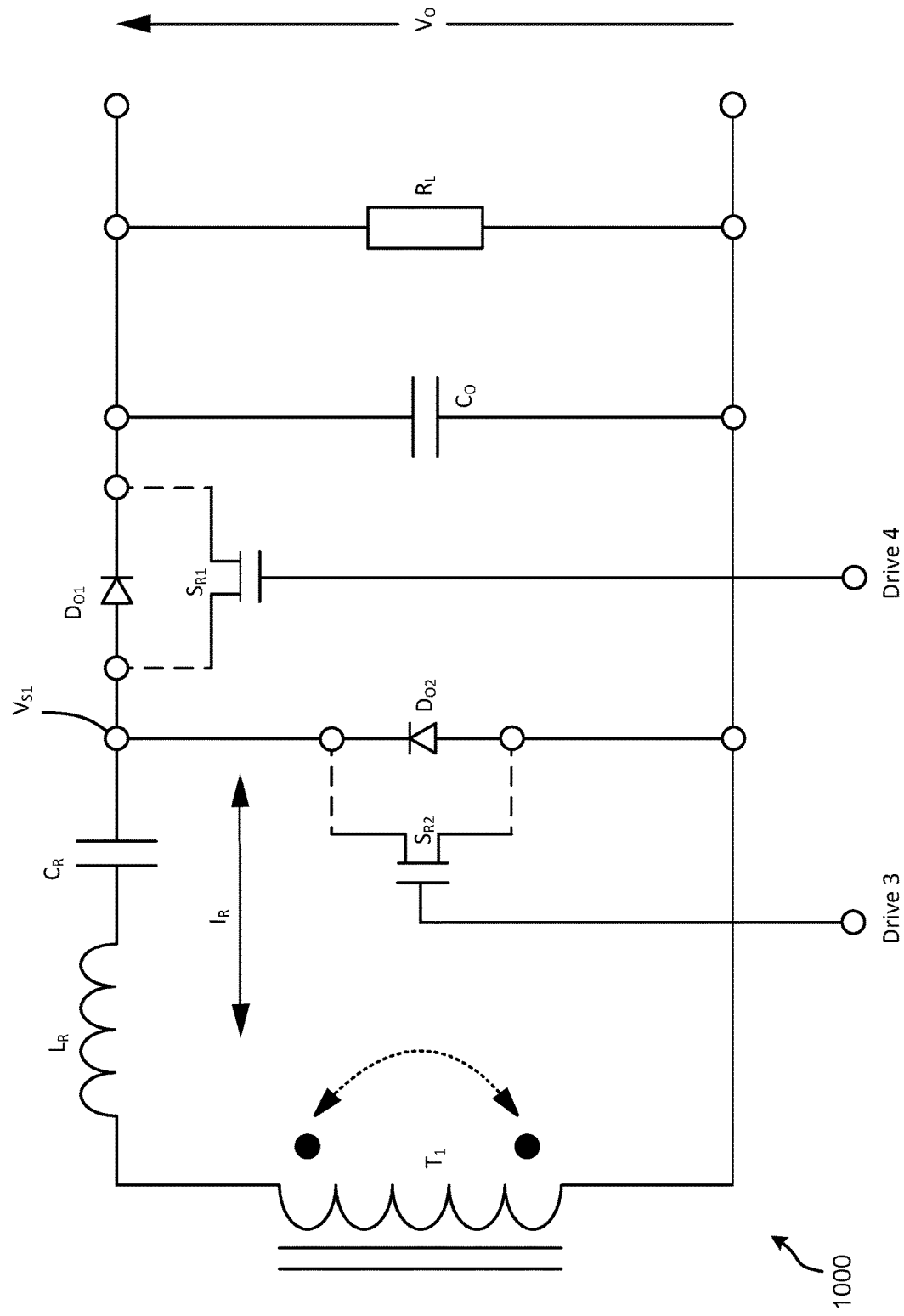

FIG. 10 illustrates another embodiment of an output stage 1000 of an isolated resonant converter. Again, the secondary winding of transformer $T_1$ may be coupled in either orientation, depending on desired functionality. This output stage 1000, however, includes a variation in which $L_R$ (which may also be leakage inductance, as previously discussed) and $C_R$ are in series instead of in parallel with the transformer secondary.

The topology output stage 1000 can be beneficial because the voltage on the rectifiers $D_{O1}$ and $D_{O2}$ (and/or their semiconductor switch equivalents) is limited to approximately the output voltage plus switch voltage drop while conducting. In practice, for example, $V_{S1}$ can be 3-4 times lower than $V_S$ in previous embodiments. This can be beneficial because lower-voltage-rating diodes and semiconductor switches can be used. These components typically often have lower on resistance and lower conducting voltage drop, thereby reducing heat and increasing efficiency. In certain applications, such as high output current applications, these benefits may justify the increased complexity of output stage 1000.

Figure 11:
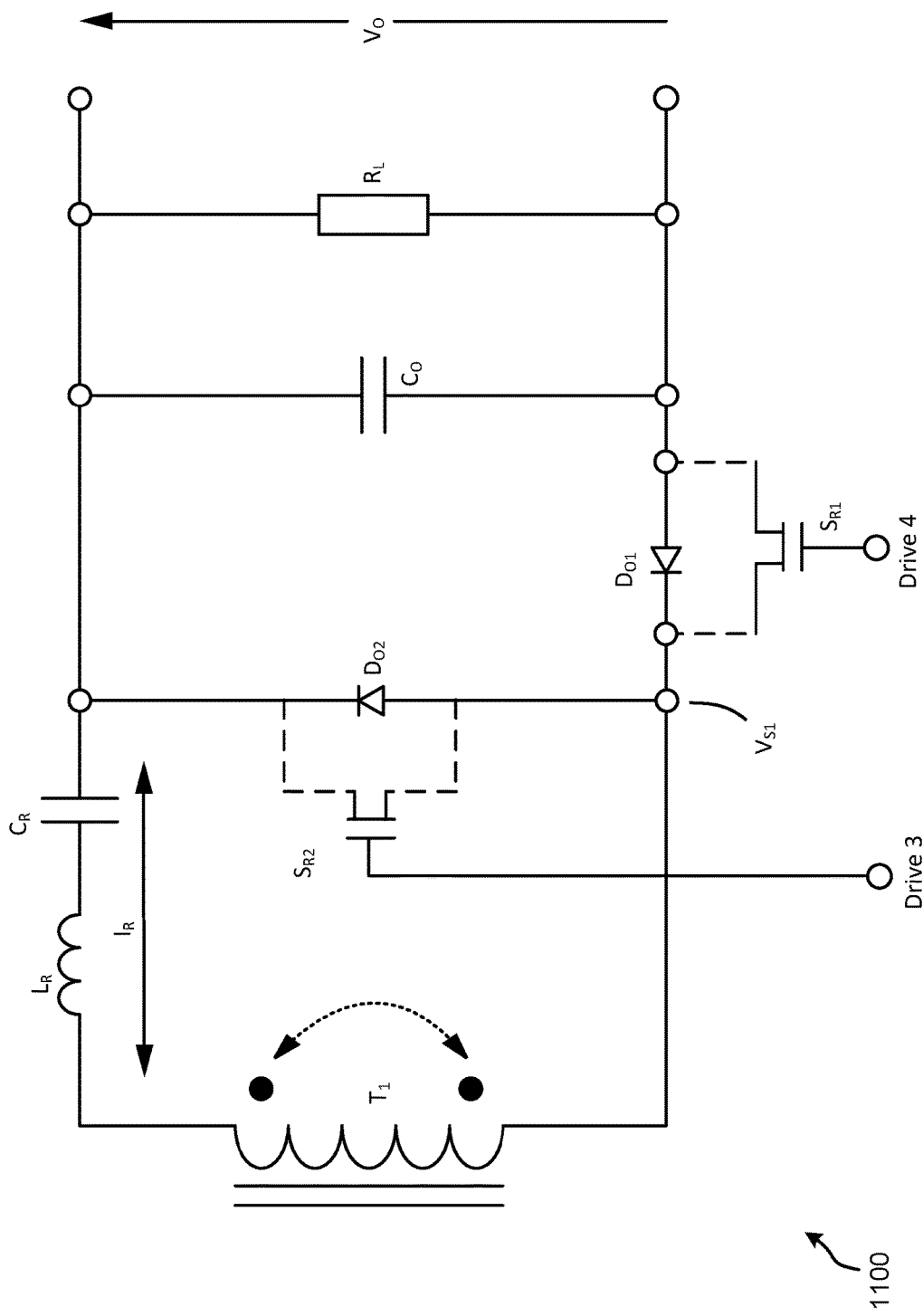
Figure 12:
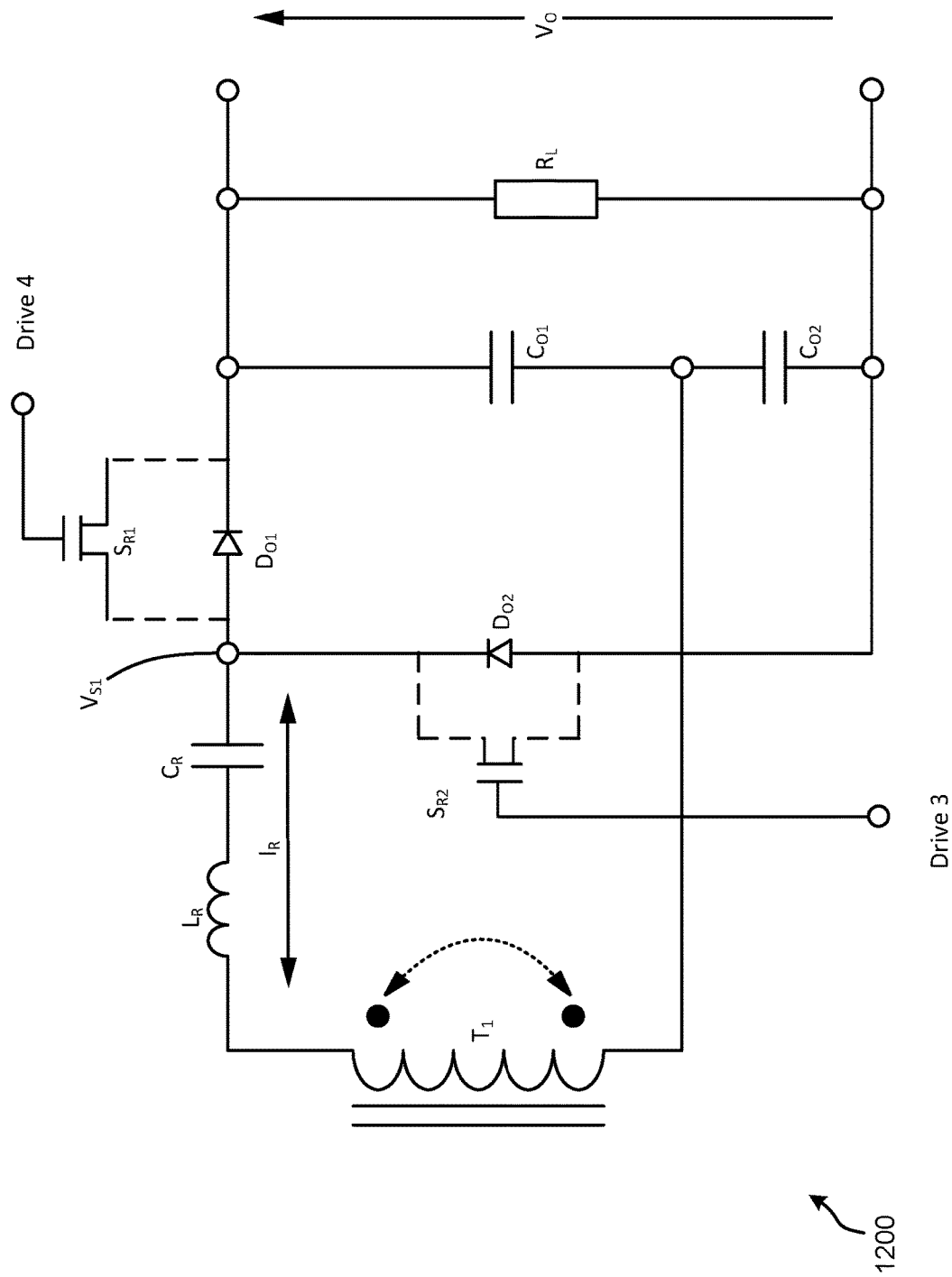

FIGS. 11 and 12 show additional embodiments of output stages 1100 and 1200, respectively. The configurations illustrate electrical equivalent variations of the output stage 1000 of FIG. 10. FIG. 10 shows how $S_{R1}$ can be coupled in series between the resonant circuitry and the positive rail of the output of the resonant converter, where FIG. 11 shows how $S_{R1}$ can be coupled in series between the resonant circuitry and the negative rail of the output of the resonant converter. FIG. 12 shows how output capacitor $C_O$ can be split in two, and the secondary winding of transformer $T_1$ can be coupled in-between the two new capacitors $C_{O1}$, $C_{O2}$.

Control for Synchronous Rectifiers

Synchronous switching can be used on output synchronous rectifier drive circuits. By utilizing zero-voltage switching, embodiments of the invention can provide for greatly-reduced switching losses. Control circuitry may monitor voltage and/or current across certain switches in the primary and/or secondary circuits to enable such efficient switching.

For output stage circuits shown in FIGS. 1, 7, and 9, the output stage resonant circuit is parallel, and there is phase difference between the current and voltage waveform. There is also a phase difference between the $S_1$ waveform and transformer waveform and the output rectifier ($D_O$) position. Therefore, the $S_1$ controller is unable to determine when to turn the synchronous rectifier ($S_R$) on and off.

Assuming that there is a parasitic or intended diode in the $S_R$ position, an ideal condition for turning on switch $S_R$ occurs when the diode voltage is minimized (conducting) and the current flow in the diode is positive (anode to cathode). The voltage information may not be enough on its own to operate $S_R$ because once the $S_R$ turns on and voltage is minimized, it will be difficult to determine when to turn $S_R$ off from the low $D_O/S_R$ voltage.

Figure 13:
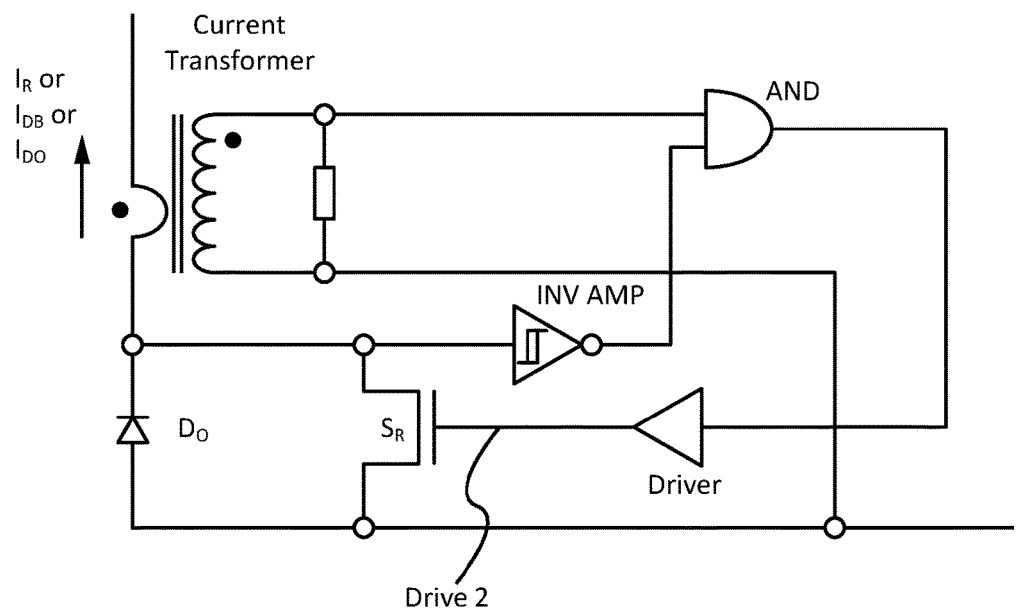
FIGS. 13-15 are schematic diagrams illustrating various embodiments of circuitry for driving synchronous rectifiers, such as those shown in previous figures.

FIG. 13 is a schematic diagram illustrating a block level solution to this problem. Here, a current transformer, AND gate, inverter amplifier, and a driver to help ensure that $S_R$ is turned on when the voltage is minimized (e.g., at or approaching zero) and the current flow in $D_O/S_R$ is positive (anode to cathode direction). $S_R$ is turned off again when the current flow is approximately zero. Here, the primary winding of the current transformer is coupled to a current of at least a portion of the resonant circuitry (e.g., $I_R$, $I_{DB}$, or $I_{DO}$), the inverter amplifier is coupled to a node of the diode $D_O$, and the AND gate is configured to perform a Boolean AND function using an output of the current transformer (e.g., from the secondary winding) and the output of the inverter amplifier. This circuit can be used to provide the signal for Drive 2 in FIGS. 1, 7, and 9.

Figure 14:
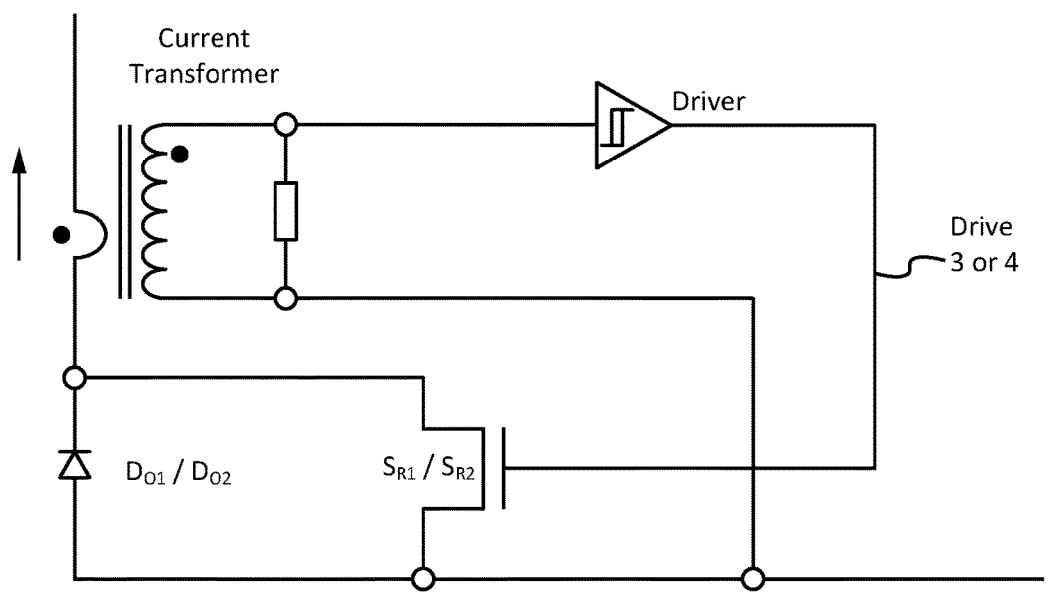

As for the circuits shown in FIGS. 10-12, because the capacitor $C_R$ is in series with the $D_O$ element, it may only be necessary to know when the current flow is positive in the rectifier (anode to cathode). Accordingly, the circuit in FIG. 14 shows a solution for determining the control drive for $S_{R1}$ and $S_{R2}$ (individually).

Figure 15:
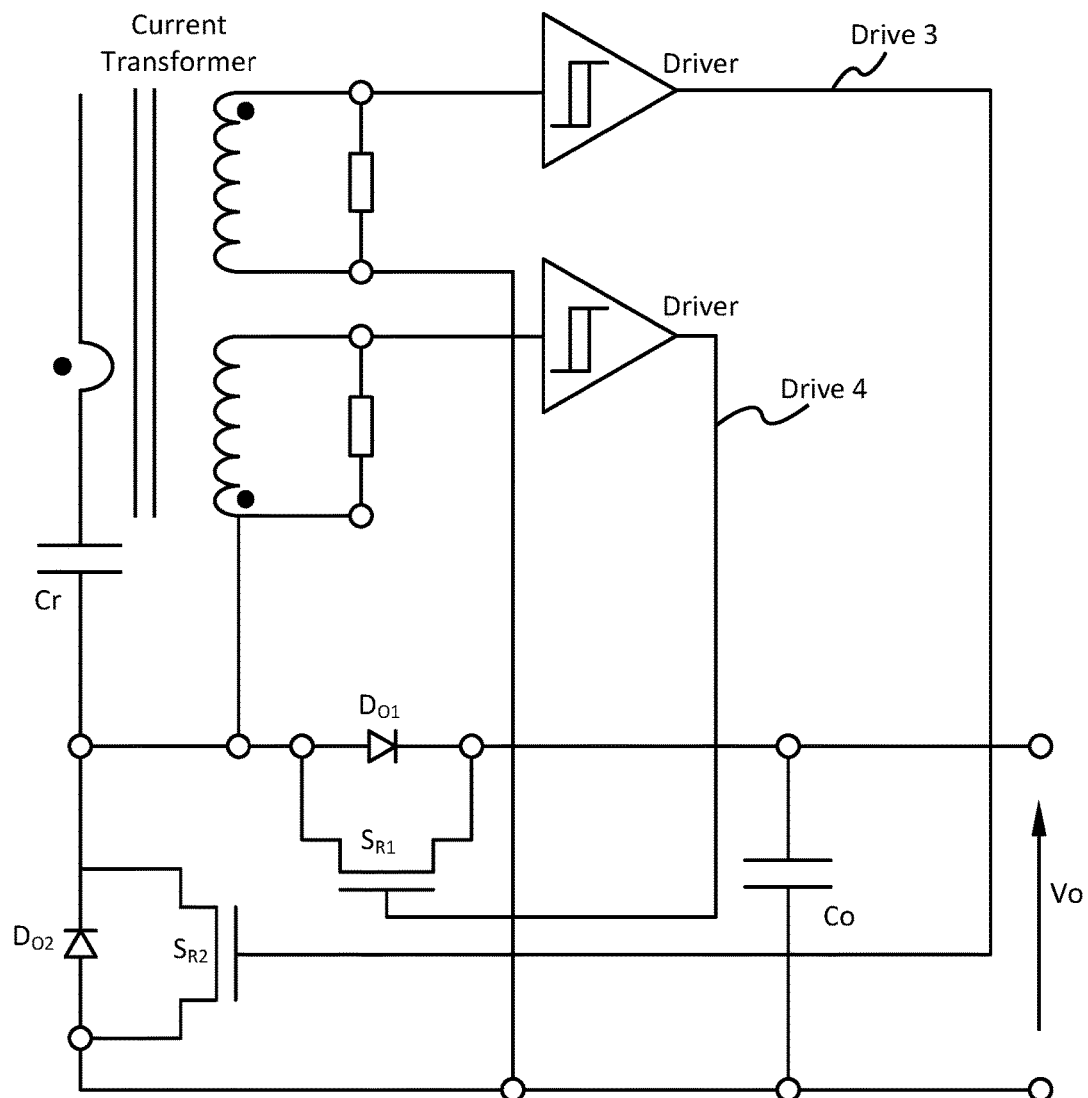

Alternatively, the current in $C_R$ may be sensed bi-directionally with a single current transformer as the positions $S_{R1}$ and $S_{R2}$ conduct in opposite phases either with two anti-phase secondary windings. An example of such a circuit is provided in FIG. 15. Here, the current in the secondary resonant circuit is detected using first and second secondary windings of a current transformer, which drive switches $S_{R1}$ and $S_{R2}$ via drivers. When the current is positive, one rectifier is turned on, and when the current is negative, the other is turned on. Alternatively, a single current transformer secondary winding with positive and negative current detection (not shown) can be utilized.

Figure 16:
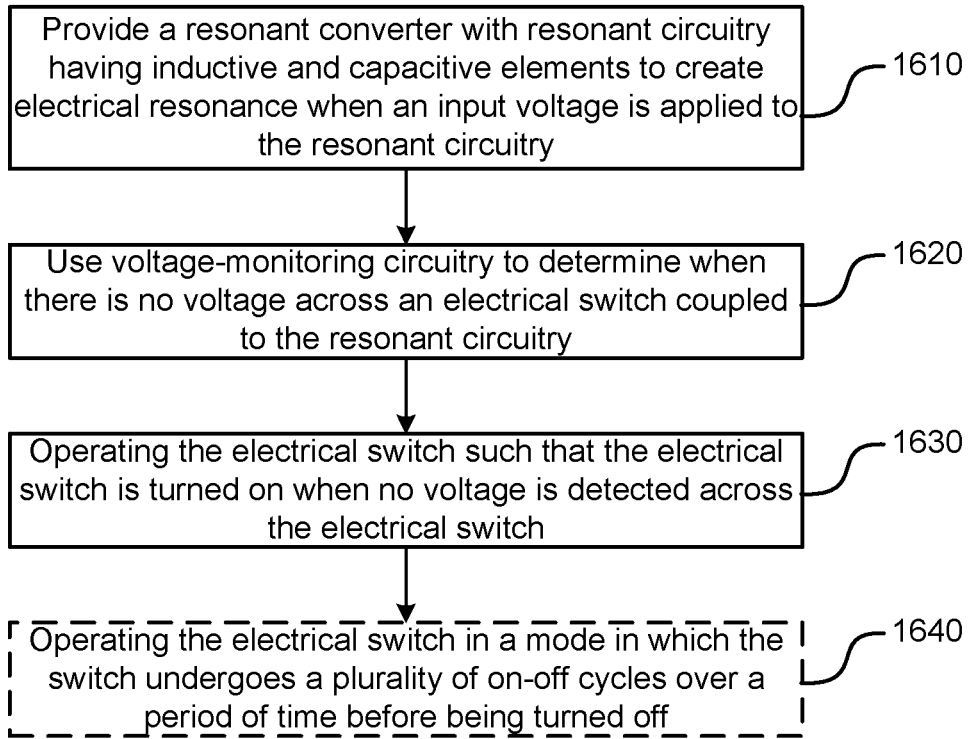
FIGS. 16 and 17 are flow diagrams illustrating embodiments of methods of providing electrical power conversion.

FIG. 16 is a flow diagram illustrating a method of providing electrical power conversion, according to one embodiment. The functionality, in whole or in part, can be provided by hardware and/or software, including the circuitry and other components described in relation to FIGS. 1, 7, and 9-12.

At block 1610, a resonant converter is provided with resonant circuitry having inductive and capacitive elements to create electrical resonance when an input voltage is applied to the resonant circuitry. Values of inductive and capacitive elements can vary, depending on switching frequency, desired functionality, and/or other factors.

At block 1620, voltage-monitoring circuitry is used to determine when there is substantially no voltage across an electrical switch coupled to the resonant circuitry. As illustrated in FIGS. 1-6, the control of a switch (e.g., switch $S_1$ of FIG. 1) can be based on the voltage across that switch. Switching efficiency is optimized when the voltage is at or near zero. Accordingly, at block 1630, the electrical switch is operated such that the electrical switch is turned on when substantially no voltage is detected across the electrical switch.

Optionally, at block 1640, the electrical switch is operated in a mode in which the switch undergoes a plurality of on-off cycles over a period of time before being turned off. A "burst mode" can allow the resonant converter to maintain output power while enabling for zero-voltage switching.

Figure 17:
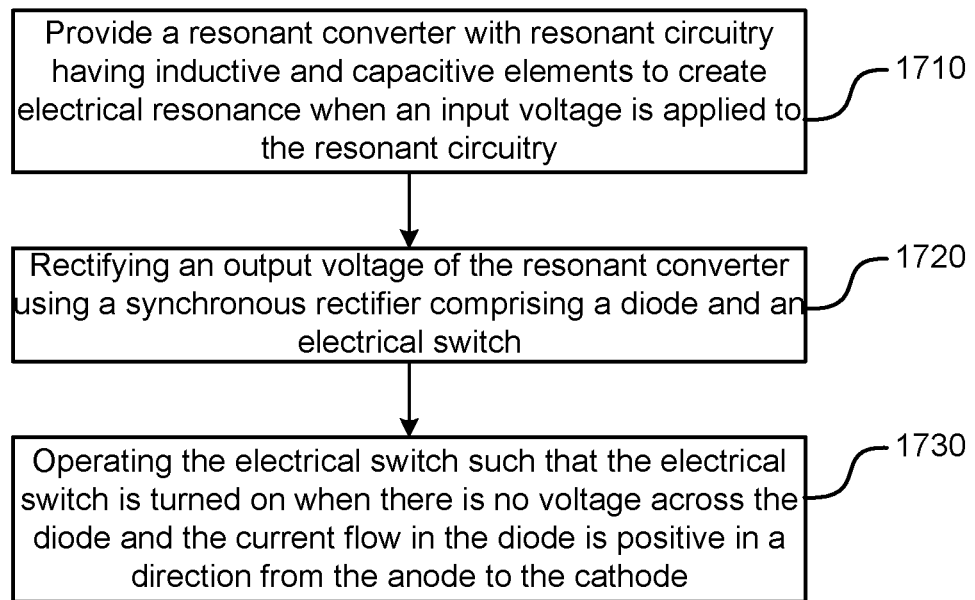

FIG. 17 is a flow diagram illustrating a method of providing electrical power conversion, according to another embodiment. Similar to FIG. 16, the functionality shown in FIG. 17, in whole or in part, can be provided by hardware and/or software, including the circuitry and other components described in relation to FIGS. 1, 7, and 9-12.

At block 1710, resonant converter is provided with resonant circuitry having inductive and capacitive elements to create electrical resonance when an input voltage is applied to the resonant circuitry. Again, values of inductive and capacitive elements can vary, depending on switching frequency, desired functionality, and/or other factors.

At block 1720, an output voltage of the resonant converter is rectified using a synchronous rectifier comprising a diode and an electrical switch. Such rectification is provided in the previously-discussed embodiments, for example, by switch $S_R$. As discussed above, switching efficiency for synchronous rectifiers may be timed not only based on voltage, but on current as well. Thus, at block 1730, the electrical switch is operated such that the electrical switch is turned on when there is substantially no voltage across the diode and the current flow in the diode is positive in a direction from the anode to the cathode.

It should be appreciated that the specific blocks shown in FIGS. 16 and 17 illustrate methods of providing electrical power conversion according to two specific embodiments. Other embodiments may include alternative and/or additional functionality. Embodiments may further include functionality that is not illustrated in FIGS. 16 and 17. Furthermore, steps may be added, removed, and/or rearranged depending on the particular applications. One of ordinary skill in the art would recognize many variations, modifications, and alternatives.

It will be understood the examples and embodiments describing "zero-voltage" switching may not operate switches at exactly zero voltage. Different tolerances of components and materials used in the circuitry can cause, for example, a zero-voltage detector to vary in its detection of zero volts. However, such a detector may detect a voltage of substantially zero (i.e., substantially no voltage), where any existing voltage is, within tolerances, considered zero volts for purposes of which it is used.

It is also understood that the examples and embodiments described herein are for illustrative purposes only and that various modifications or changes in light thereof will be suggested to persons skilled in the art and are to be included within the spirit and purview of this application and scope of the appended claims.

Controlled Burst Mode

Embodiments may potentially utilize a variety of different methods for modulating $S_1$ to achieve output regulation while maintaining zero-voltage switching, including a controlled "burst mode." An overview of such modulation techniques are described below.

Frequency Modulation. With frequency modulation, the higher the frequency the lower the value of $I_P$, which means that switching frequency can be used to regulate output power. However, frequency regulation typically excludes the use of a zero-voltage detector, which (zero-voltage detecting method) is in conflict with frequency modulation because it can change the $T_{OFF}$ time (duty-cycle) and consequently the switching period (and therefore frequency).

Maximum $T_{ON}$ Modulation. In accordance with maximum $T_{ON}$ modulation, $S_1$ can be modulated such that Ton has a maximum on time proportional to $1/V_{IN}$. That is, the higher the input voltage $V_{IN}$, the shorter the length of Ton. This helps ensure that the maximum power transfer in the circuit is relatively constant with any variation in $V_{IN}$, as $I_P$ is closely related to $T_{ON}$. Although this may be the case for maximum power transfer (maximum output load) further $T_{ON}$ modulation may be necessary to regulate the output (voltage, current, or power) to lower/light output loads. Additional details regarding optimal $T_{ON}$ modulation are provided herein below.

Controlled Burst Mode. A maximum time for $T_{ON}$ may be preferentially proportional to $1/V_{IN}$. Here, however, the switch $S_1$ is driven on and off for burst intervals, rather than continually. In this way the average power transferred is reduced.

Figure 4:
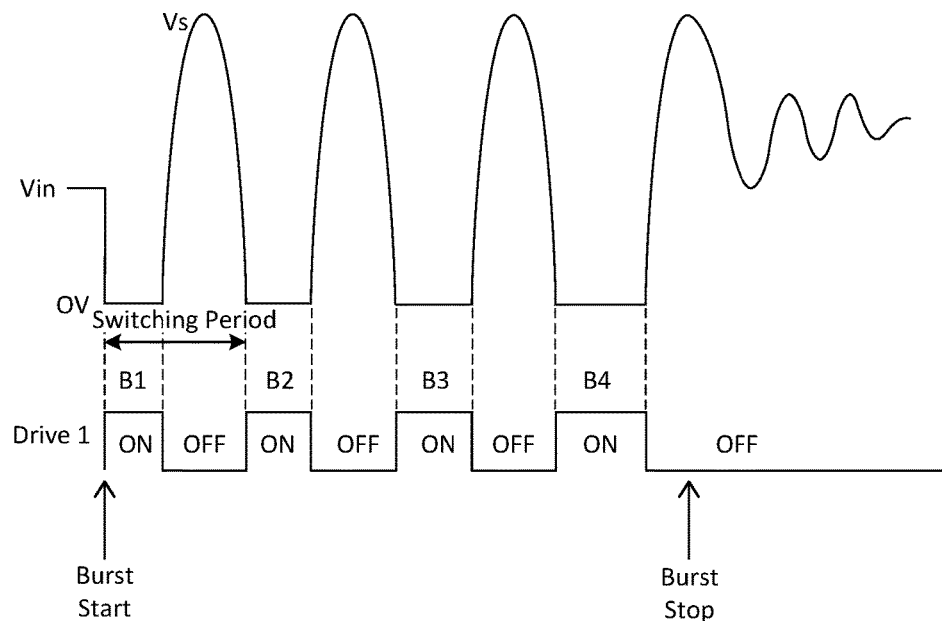
FIGS. 4 and 5 show waveforms of $V_S$ and Drive 1, illustrating burst mode according to one embodiment.
Figure 5:
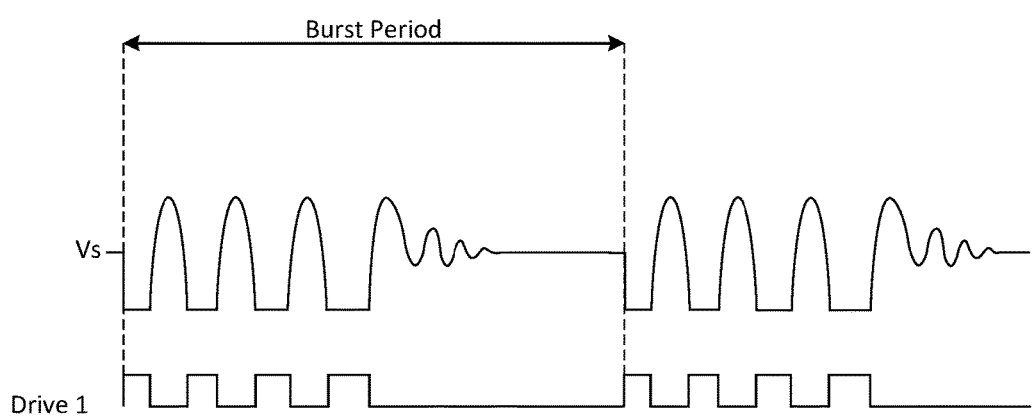

FIGS. 4 and 5 show waveforms of $V_S$ and Drive 1, illustrating burst mode according to one embodiment. FIG. 4 illustrates waveforms of a single series (or "burst") of on/off cycles for $S_1$. Output power can be maintained and/or adjusted by adjusting the frequency of bursts. FIG. 5 illustrates an example of how bursts be provided in succession to maintain a certain output power. Additionally, as indicated above, $T_{ON}$ may be adjusted to maintain a certain output power and zero-voltage switching.

As FIG. 4 illustrates, the on time $T_{ON}$ of each on/off cycle in a burst mode can be progressively longer. These increasing $T_{ON}$ periods are labeled B1, B2, B3, and B4. By increasing the lengths of $T_{ON}$ as Drive 1 progresses from B1 to B4, the resonant network is able to progressively establish resonance for each burst without overshoot. Without using such progressive modulation, the initial resonant peaks of $V_S$ following B1, B2 etc. would be much higher and overshoot could result, which could be harmful for the switch $S_1$.

It will be understood that the waveforms of FIGS. 4 and 5 are provided for illustrative purposes. In practice, various features of the illustrated waveforms, such as the number of switching periods in a single burst period, the magnitude of Vs and Drive 1, the duty cycle of each on/off cycle, and the like can vary, depending on the configuration, power requirements, and/or other factors.

Further, the "burst mode" function can be made user programmable in order to easily adapt to particular application and preserve the premium efficiencies. It can be beneficial to initiate burst mode when zero-volt has not been achieved in resonant circuits. This is especially the case for a wide range of applications in which the converter operates to minimize power dissipation at light loads to achieve high efficiencies. Without a mechanism to detect zero-volt, switches can be damaged at light loads when switching at very high frequencies.

In accordance with some embodiments, the switch $S_1$ can be a GaN transistor, such as a MOSFET, MESFET, and the like. In such embodiments, the switch $S_1$ can be modulated at much higher frequencies than similar silicon-based switches. Higher-frequency switching allows for a reduction in size of magnetic and capacitive components, which can reduce the overall size and cost of the power adapter. In some embodiments, for example, the order of magnitude of the switching frequencies can be in the megahertz, while bursting frequencies can be in the tens of kilohertz.

Figure 6:
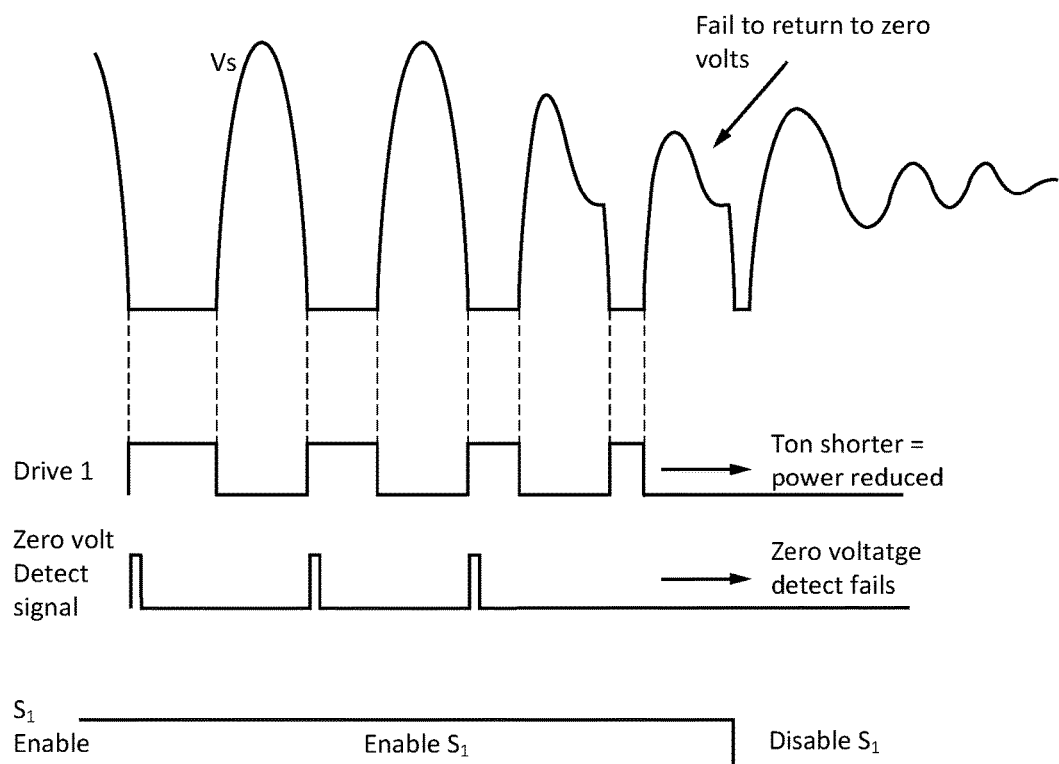
FIG. 6 shows waveforms illustrating how Drive 1 reduces $T_{ON}$ to reduce output power, and how this can result in insufficient current to drive $V_S$ back to zero.

$T_{ON}$ Modulation. As a variation to the burst mode described above, $T_{ON}$ can be controlled for lower output loads to achieve the required set-point and regulation. (That said, some embodiments may use $T_{ON}$ modulation together with other modulation techniques.) Although $T_{ON}$ modulation can be successful in the output power range of most applications, at lower output loads the $T_{ON}$ time will be small. A smaller $T_{ON}$ time can result in a smaller current $I_P$. And in certain circumstances there may not be enough circulating energy in the resonant network for Vs to return to zero-volts. FIG. 6 helps illustrate this dilemma, as well as a solution that can be implemented, according to some embodiments.

FIG. 6 shows waveforms illustrating how, using $T_{ON}$ modulation, Drive 1 reduces $T_{ON}$ to reduce output power, and how this can result in insufficient current $I_{S1}$ (not shown) to drive $V_S$ back to zero. Here, a zero-voltage detection circuit can be used to recognize when zero-voltage switching fails to occur and help the circuit prevent efficiency loss and potential damage to the switch $S_1$ that could result from switching when $V_S$ is not at or near zero.

In the illustrated example, the zero voltage detection signals can be monitored to determine when there is failure of $V_S$ to return to zero. If, for example, the zero-volt-detection signal is not received for a number of switching cycles, Drive 1 is disabled for a period of time so that when Drive 1 is enabled again, the circuit requires more instantaneous power to regulate the average power to the required level. The increase in power requirements enables Drive 1 to have longer $T_{ON}$ times, which allow for zero-voltage switching again for the next number of cycles.

In other words, a burst mode can be initiated cyclically when zero-voltage switching of $V_S$ is detected to have failed.

Methods for detecting zero-voltage enable adaptive control to enhance burst mode operation and preserve converter efficiency at all loads—especially light loads—and prevent potential switch damage.

Figure 18:
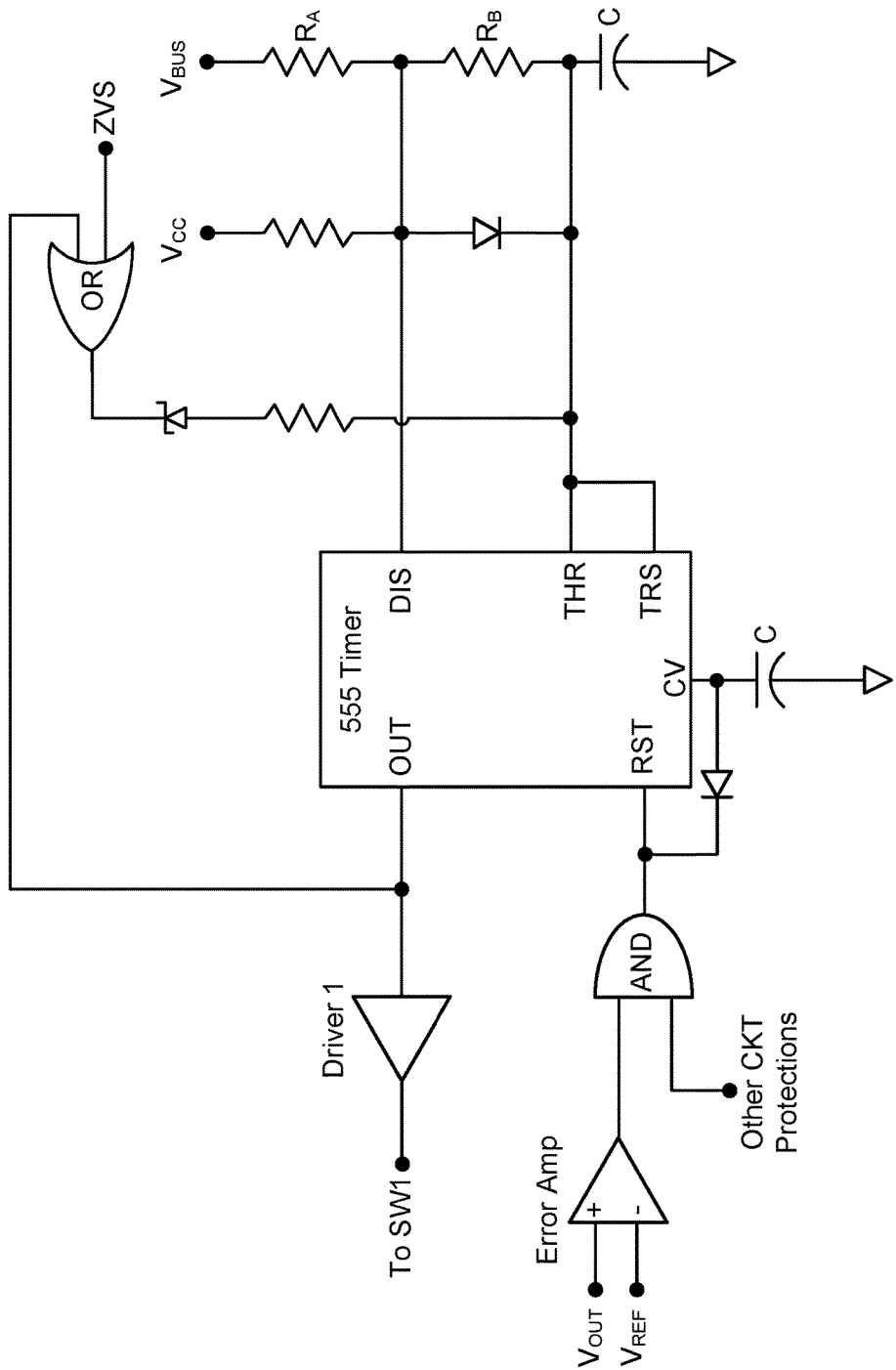
FIG. 18 is a schematic diagram showing an example controller circuit for providing $S_1$ control, according to one embodiment.

FIG. 18 shows an example controller circuit for providing $S_1$ control, according to one embodiment. A 555 timer is used in a stable mode to generate circuit resonant frequency. $R_A$, $R_B$ and C values determine the frequency. The 555 timer's output frequency and zero-volt detect signals are fed to an OR gate which then it would trigger the timer output. A zero-volt detect signal is necessary to set the timer output high. Output of the 555 timer is fed to Driver 1. Output voltage is also sensed and fed to a comparator for voltage regulation. The 555 timer is therefore reset in case the output voltage is higher than a reference signal Vref or other protection signals are activated low.

Controlled Active Clamping

A controlled active clamping technique can be used to hold peak resonant voltage at pre-determined levels in order to force zero-volt switching and prevent possible switch damage due to stress voltage, as well as eliminate unnecessary clipping that leads to excess losses and converter inefficiency. In an isolated converter, when transformer peak reset voltage is significantly larger than the input voltage, a clamp circuit is activated at predetermined peak voltage. Modulation can reduce excess loss in the clamp circuit under varying load conditions. The modulation of peak voltage allows for efficient power transfer and controllable output voltage regulation.

Typically snubbing and clamping circuits, such as resistor-capacitor-diode (RCD) circuits, are used on switches to limit voltage spikes to reduce component stress. This leads to extra circuit dissipation, and thus power savings can be realized. In such circuits, a voltage spike is caused by the energy stored in the transformer's leakage inductance of an isolated resonant circuit, when the switch turns off and abruptly halts current flow in the primary winding. The first step to reducing both the voltage spike and the loss in the clamp is to design a transformer with minimal leakage inductance, which may not be ideal for a resonant converter. The resonance between this inductance and the parasitic capacitance of the switch produce large voltage stress as well as losses, therefore decreasing converter efficiency. The clamp resistance can be increased to further reduce the loss, but doing so also increases the magnitude of the voltage spike. During the reset portion of the switching cycle, the reflected output voltage is impressed across the clamp resistor leading to extra loss. Using a higher voltage switch provides more margin for the voltage spike and allows for a much larger resistor. However, an increased voltage rating results in higher on-resistance which leads to lower efficiency at high loads. When a controller is operating in burst mode, the clamp circuit discharges between ON states. If the clamp capacitor is too large, excess energy is stored and dissipated during the OFF state. In some situations, the clamp capacitor may not fully discharge before the next ON state begins.

Embodiments can utilize an active clamping technique rather than an RCD clamp circuit. A non-dissipative LC plus clamp switch circuit, for example, can force the transformer leakage inductance energy to oscillate on input as reactive power and/or transfer the energy to load as real active power.

In either case, the energy is not dissipated in a resistor and the losses are decreased. Benefits to an active clamp circuit include the ability to transfer energy under wide line and load variations. The technique is suitable for resonant circuits including Power-Factor Correction (PFC) circuits. Transformer reset is accomplished with an active clamp circuit consisting of switch and a capacitor working with transformer leakage inductance. Active clamp circuit works as a controllable current source, so as to regulate power according to load variations.

This arrangement offers many benefits. For example, the duty cycle can go higher than 50%, resulting in higher turns ratio, lower primary currents and secondary voltages, and smaller output inductor. Also, the voltage stress on the primary switch remains relatively constant over the full input voltage range, leading to better overall efficiency. In addition, zero-volt switching is possible with this approach, which can lead to further size reduction by increasing the switching frequency.

Figure 19:
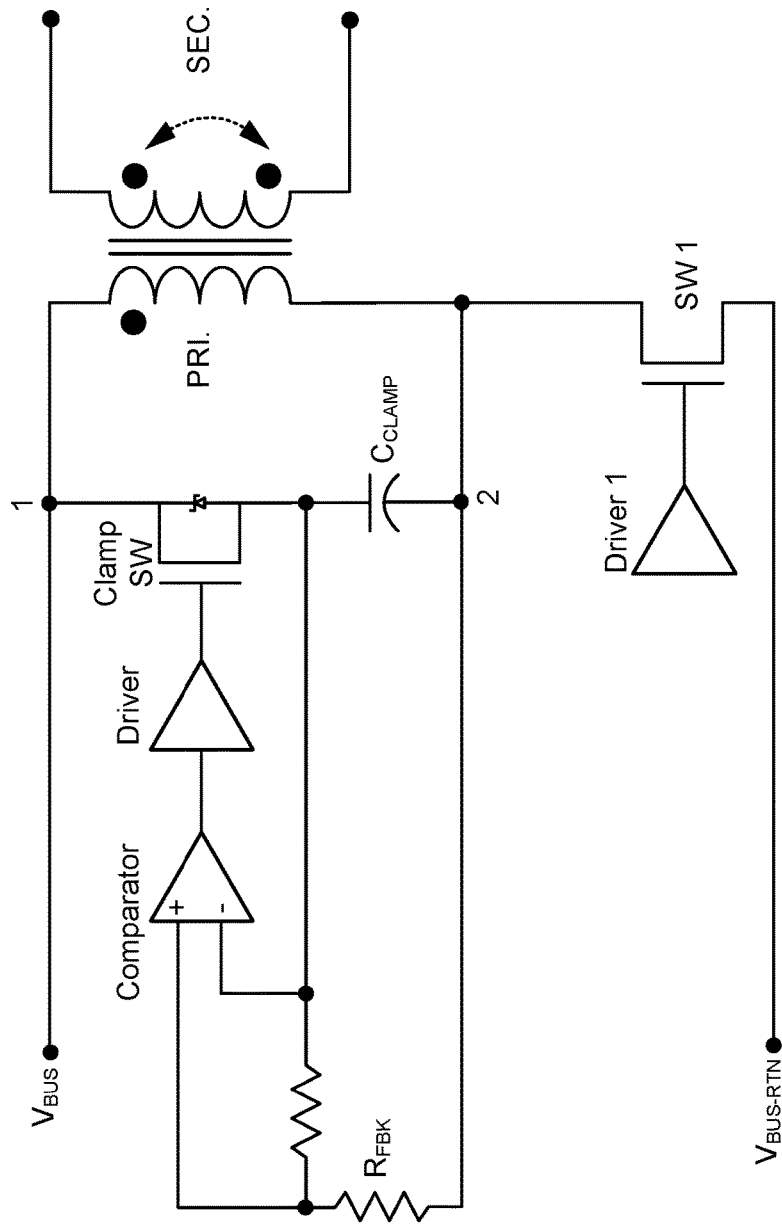
FIGS. 19-21 are schematic diagrams showing embodiments of active clamp circuits.
Figure 20:
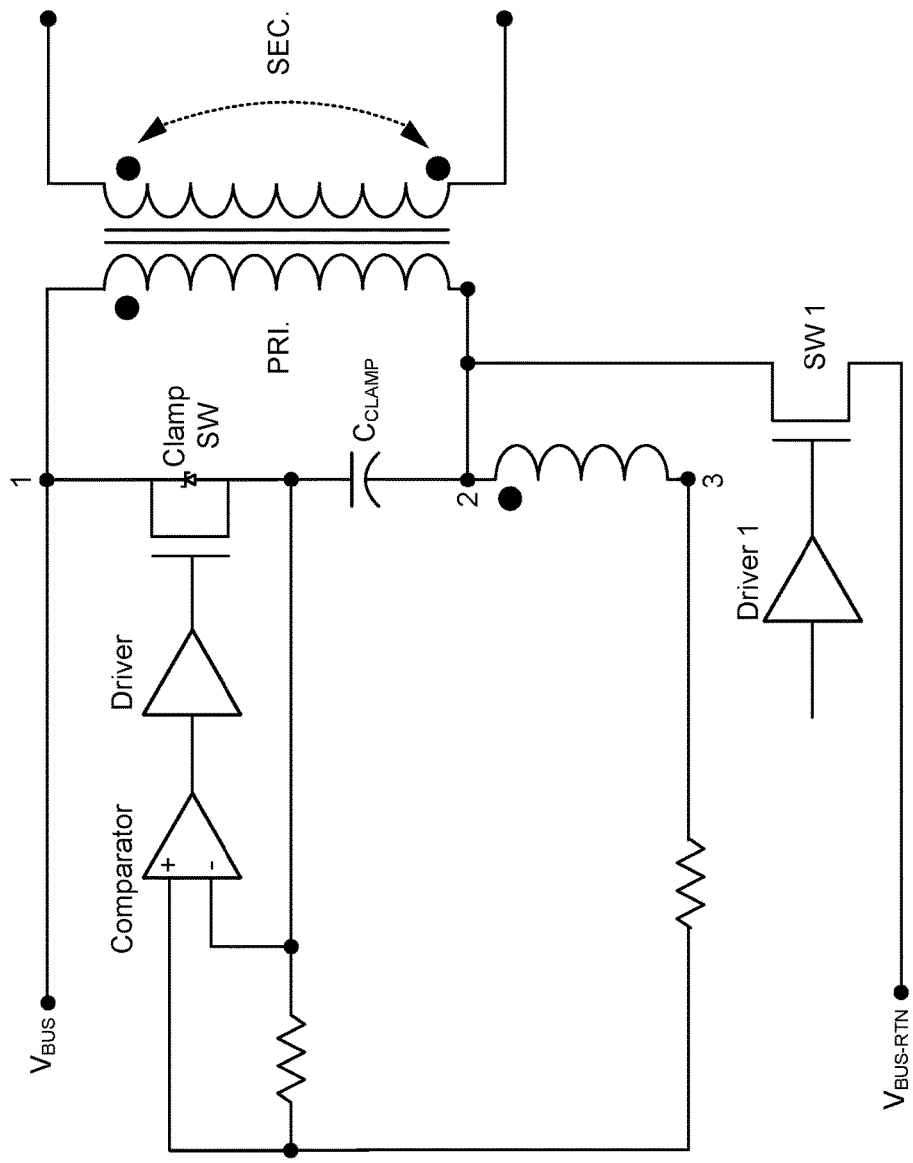
Figure 21:
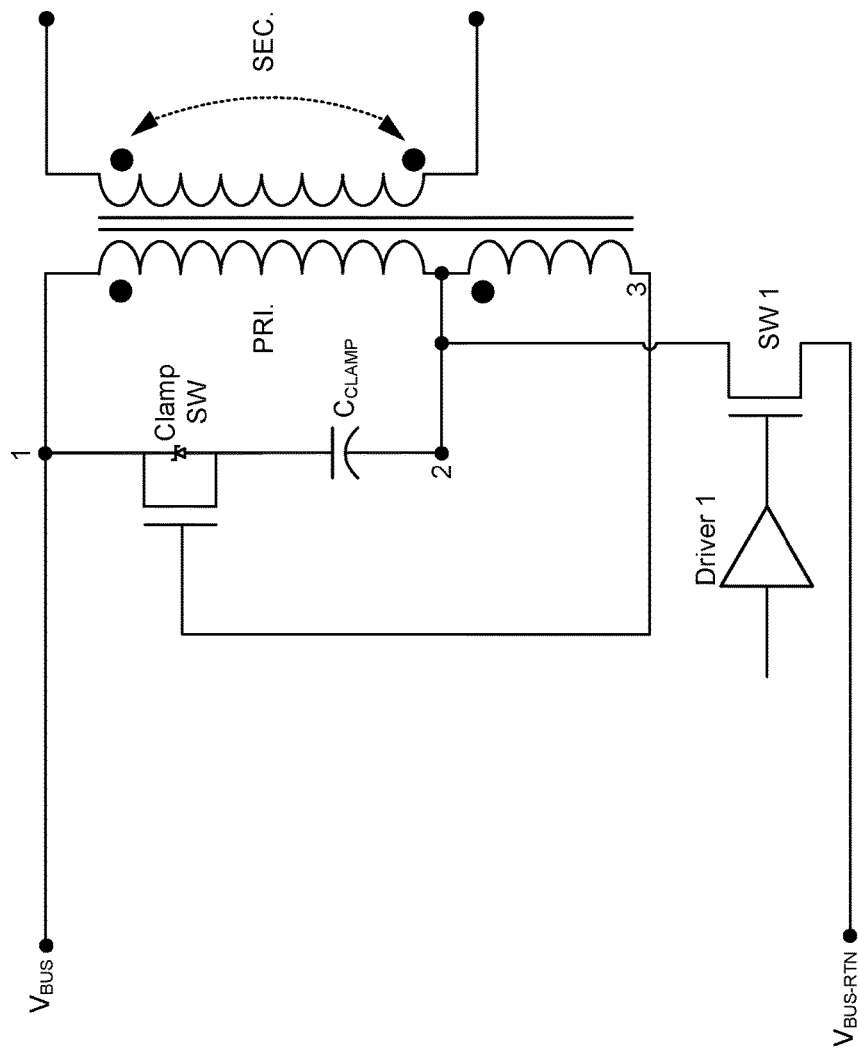

FIGS. 19-21 are schematics of examples active clamp circuit that can be utilized in embodiments for isolated converters. Values for the various components involved, alterations to the architecture, and other variations can vary, depending on desired functionality and will be understood by a person of ordinary skill in the art. As shown, the circuits of FIGS. 19 and 20 utilize a comparator and driver to determine when the active clamp switches on, which, as described above, can occur at any of a variety of desired voltages, depending on application and desired functionality (e.g., 500 V, 800 V, etc.). The circuit of FIG. 20, on the other hand, illustrates how clamp switch can be fed by a winding of the transformer between nodes 2 and 3. Thus, the turn-on voltage for the clamp switch can be determined by number of windings between nodes 2 and 3. The circuit in FIG. 21 therefore illustrates how active clamping can be done with passive components.

Figure 22:
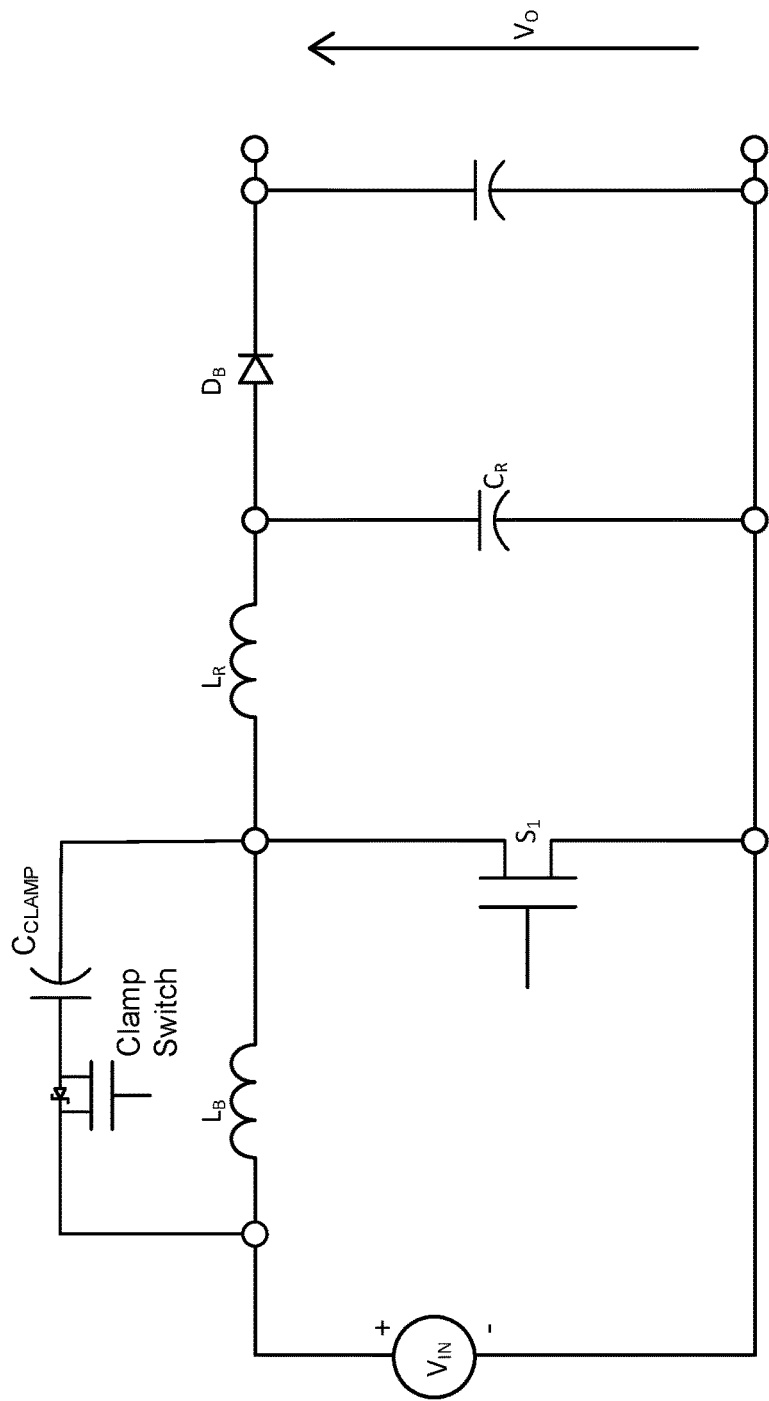
FIG. 22 is a schematic diagram showing active clamp usage in another embodiment.

FIG. 22 illustrates a technique applied to a PFC circuit similar to the non-isolated circuit of FIG. 1. In a low-power, low-current application, using a small magnetizing inductance to achieve zero-volt switching can be more appropriate. Resonance between the leakage inductance and the clamp capacitance takes place when the transformer is reset. Magnetizing inductance is designed together with the switching frequency in order to provide zero-volt switching at high input voltage and keep the size and losses in the transformer small.

When transformer peak reset voltage is significantly larger than the input voltage, the clamp circuit can be activated at a predetermined peak voltage. Modulation can reduce excess loss in the clamp circuit under varying load conditions. Modulation of peak voltage allows for efficient power transfer and controllable output voltage regulation. Having the ability to control the peak voltage level clamping also allows for zero-volt switching of $S_1$ and also the clamp switch. Clamp circuit and burst mode control force zero-volt switching under varying load conditions, especially light loads.

The voltage across $S_1$ can be sensed using techniques similar to the methods shown in FIGS. 19 and 20. Other methods can also be applied for sensing voltage. The sensed signal is compared to a reference voltage by comparator in the clamping circuit. At a predetermined OFF state voltage (i.e., a threshold voltage), clamping switch is turned on, and excess resonant energy is put back to the $V_{BUS}$. The adaptive nature of the circuit makes it possible to compensate for load and environmental variations to achieve higher efficiencies.

Having described various embodiments of the invention, it will be understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A resonant converter comprising:
   resonant circuitry having inductive and capacitive elements configured to create electrical resonance when an input voltage is applied;
   a synchronous rectifier coupled between at least a portion of the resonant circuitry and an output of the resonant converter, the synchronous rectifier comprising:
      a first diode coupled to the output of the resonant converter, and
      a first electrical switch coupled in parallel to the first diode;
   first control circuitry configured to operate the first electrical switch such that the first electrical switch is turned on when there is substantially no voltage across the first diode and current flow in the first diode is positive in a direction from anode to cathode;
   a single electrical switch coupled between the input voltage and at least the portion of the resonant circuitry, the single electrical switch comprising a second electrical switch;
   second control circuitry configured to operate the second electrical switch such that the second electrical switch is turned on when there is substantially no voltage across the second electrical switch; and
   clamping circuitry to control a voltage across the single electrical switch, the clamping circuitry comprising:
      a clamp capacitor;
      an electrical clamp switch coupled in series with the clamp capacitor and the single electrical switch;
      a comparator circuit coupled to the clamp capacitor and configured to determine a voltage spike at the single electrical switch; and
      a driver coupled to an output of the comparator circuit and configured to turn on the electrical clamp switch in response to the voltage spike.

2. The resonant converter of claim 1 wherein the first electrical switch comprises a GaN transistor.

3. The resonant converter of claim 1 wherein the first control circuitry further comprises:
   a current transformer coupled to a current of at least a portion of the resonant circuitry;
   an inverter amplifier coupled to the first diode; and
   an AND gate configured to perform a Boolean AND function using an output of the current transformer and an output of the inverter amplifier.

4. The resonant converter of claim 1, wherein the resonant converter is a non-isolated resonant converter.

5. The resonant converter of claim 1, wherein:
   the resonant converter is an isolated resonant converter having a transformer coupling an input stage with an output stage; and
   the output stage comprises the synchronous rectifier.

6. The resonant converter of claim 1, wherein:
   the output of the resonant converter has a positive rail and a negative rail; and
   the synchronous rectifier is coupled in series between the resonant circuitry and the positive rail of the output of the resonant converter.

7. The resonant converter of claim 1, wherein:
the output of the resonant converter has a positive rail and a negative rail; and
the synchronous rectifier is coupled in series between the resonant circuitry and the negative rail of the output of the resonant converter.

8. The resonant converter of claim 1 wherein the second control circuitry comprises:
a timing circuit configured to generate a drive signal with a predetermined resonant frequency for operating the second electrical switch; and
a second comparator coupled to the drive signal and a reference signal and configured to reset the timing circuit when the drive signal is greater than the reference signal.

9. The resonant converter of claim 1 further comprising a zero-voltage detection circuit configured to detect zero voltage at the second electrical switch and turn off the second electrical switch when no zero voltage at the second electrical switch is detected for a number of switching cycles.

10. The resonant converter of claim 1 wherein the second control circuitry is configured to operate the second electrical switch in a burst mode to control a turn-on time and a turn-off time of the second electrical switch, the turn-on time being progressively longer with each switching cycle.

11. A resonant converter comprising:
resonant circuitry having inductive and capacitive elements configured to create electrical resonance when an input voltage is applied;
a first synchronous rectifier and a second synchronous rectifier, wherein each of the first synchronous rectifier and the second synchronous rectifier comprises:
a diode; and
an electrical switch in parallel with the diode; and
first control circuitry configured to operate the first synchronous rectifier and the second synchronous rectifier such that, for each of the first synchronous rectifier and the second synchronous rectifier, the electrical switch is turned on when current flow in the diode is positive in a direction from anode to cathode;
a single electrical switch coupled between the input voltage and at least a portion of the resonant circuitry, the single electrical switch comprising a second electrical switch;
second control circuitry configured to operate the second electrical switch such that the second electrical switch is turned on when there is substantially no voltage across the second electrical switch; and
clamping circuitry to control a voltage across the single electrical switch, the clamping circuitry comprising:
a clamp capacitor; and
an electrical clamp switch coupled in series with the clamp capacitor and the single electrical switch;
a comparator circuit coupled to the clamp capacitor and configured to determine a voltage spike at the single electrical switch; and
a driver coupled to an output of the comparator circuit and configured to turn on the electrical clamp switch in response to the voltage spike.

12. The resonant converter of claim 11 wherein the electrical switch of either or both of the first synchronous rectifier and the second synchronous rectifier comprises a GaN transistor.

13. The resonant converter of claim 11 further comprising a current transformer having:
a primary winding configured to conduct a current of at least the portion of the resonant circuitry;
a first secondary winding configured to drive the electrical switch of the first synchronous rectifier; and
a second secondary winding, having an opposite polarity of the first secondary winding, configured to drive the electrical switch of the second synchronous rectifier.

14. The resonant converter of claim 13 wherein:
the first secondary winding is configured to drive the electrical switch of the first synchronous rectifier via a first driver; and
the second secondary winding is configured to drive the electrical switch of the second synchronous rectifier via a second driver.

15. The resonant converter of claim 13 wherein the second secondary winding is further coupled to an output of the resonant converter.

16. The resonant converter of claim 11 wherein:
an output of the resonant converter has a positive rail and a negative rail; and
the first synchronous rectifier is coupled in series between the resonant circuitry and the negative rail of the output of the resonant converter.

17. The resonant converter of claim 11 wherein:
an output of the resonant converter has a positive rail and a negative rail; and
the first synchronous rectifier is coupled in series between the resonant circuitry and the positive rail of the output of the resonant converter.

* * * * *